US012515768B2

(12) United States Patent
Namba et al.

(10) Patent No.: US 12,515,768 B2
(45) Date of Patent: Jan. 6, 2026

(54) MARINE VESSEL PROPULSION CONTROL SYSTEM

(71) Applicant: SUZUKI MOTOR CORPORATION, Hamamatsu (JP)

(72) Inventors: Masahiro Namba, Hamamatsu (JP); Naoki Takahashi, Hamamatsu (JP); Mamoru Takabe, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 57 days.

(21) Appl. No.: 18/680,590

(22) Filed: May 31, 2024

(65) Prior Publication Data

US 2024/0400172 A1 Dec. 5, 2024

(30) Foreign Application Priority Data

Jun. 2, 2023 (JP) ................................ 2023-091675

(51) Int. Cl.

*B63B 79/20* (2020.01)
*B63B 79/40* (2020.01)
*B63H 20/14* (2006.01)
*B63H 21/21* (2006.01)
*F02D 9/08* (2006.01)

(52) U.S. Cl.

CPC .............. *B63B 79/40* (2020.01); *B63B 79/20* (2020.01); *B63H 20/14* (2013.01); *B63H 21/21* (2013.01); *F02D 9/08* (2013.01); *B63H 2021/216* (2013.01)

(58) Field of Classification Search

None

See application file for complete search history.

(56) References Cited

U.S. PATENT DOCUMENTS

| | | | | |
|---|---|---|---|---|
| 9,359,057 | B1 * | 6/2016 | Andrasko | B63H 20/12 |
| 9,522,723 | B1 * | 12/2016 | Andrasko | B63H 20/12 |
| 10,279,880 | B2 * | 5/2019 | Namba | B63H 20/20 |
| 2018/0334234 | A1 * | 11/2018 | Namba | B63H 20/14 |

FOREIGN PATENT DOCUMENTS

| | | | | | |
|---|---|---|---|---|---|
| CN | 116222574 | A * | 6/2023 | G01C 21/203 |
| DE | 60317237 | T2 * | 8/2008 | B63B 49/00 |
| JP | 2018192976 | A * | 12/2018 | B63H 21/213 |
| KR | 100210316 | B1 * | 7/1999 | B63B 25/24 |
| KR | 20170088123 | A * | 8/2017 | G05D 1/0005 |
| KR | 102212386 | B1 * | 2/2021 | B63H 25/04 |

* cited by examiner

*Primary Examiner* — Shelley Chen
(74) *Attorney, Agent, or Firm* — Stein IP, LLC

(57) ABSTRACT

A marine vessel propulsion control system includes a simulated ship speed calculator which calculates a simulated ship speed by multiplying an engine rotational speed when the ship travels forward in a propeller co-rotating state and the power transmission mechanism continues the forward connection state by a scale conversion coefficient corresponding to a ship length, and which decreases the simulated ship speed based together with elapse of time. A shift controller, in a case where the simulated ship speed is not equal to or less than a predetermined simulated ship speed threshold when the operation part is changed from the forward position to the neutral position and is subsequently changed to the reverse position, switch the state of the power transmission mechanism from the disconnection state to the reverse connection state after waiting for the simulated ship speed to become equal to or less than the simulated ship speed threshold.

6 Claims, 10 Drawing Sheets

FIG. 5

40

STORAGE UNIT

41

SHIP LENGTH ESTIMATION MAP

| GROSS HORSE-POWER [PS] ([kW]) | 100 (73.5) | 171 (125.7) | 243 (178.7) | 314 (230.9) | 386 (283.8) | 457 (336.0) | 529 (389.0) | 600 (441.2) | 690 (507.4) | 780 (573.5) |
|---|---|---|---|---|---|---|---|---|---|---|
| ESTIMATED SHIP LENGTH $L_s$ [m] | 5.3 | 5.7 | 6 | 6.4 | 6.8 | 7.2 | 7.6 | 7.9 | 8.4 | 8.9 |

| GROSS HORSE-POWER [PS] ([kW]) | 870 (639.7) | 960 (705.9) | 1050 (772.1) | 1260 (926.5) | 1470 (1080.9) | 1680 (1235.3) | 1890 (1389.7) | 2100 (1544.1) | 2500 (1838.2) | 3000 (2205.9) |
|---|---|---|---|---|---|---|---|---|---|---|
| ESTIMATED SHIP LENGTH $L_s$ [m] | 9.4 | 9.8 | 10.3 | 11.4 | 12.5 | 13.7 | 14.8 | 15.9 | 18 | 20.6 |

42

SCALE CONVERSION COEFFICIENT DETERMINATION MAP

| ESTIMATED SHIP LENGTH $L_s$ [m] | 5.3 | 5.7 | 6 | 6.4 | 6.8 | 7.2 | 7.6 | 7.9 | 8.4 | 8.9 |
|---|---|---|---|---|---|---|---|---|---|---|
| SCALE CONVERSION COEFFICIENT $S_c$ | 2.30 | 2.39 | 2.45 | 2.53 | 2.61 | 2.68 | 2.76 | 2.81 | 2.90 | 2.98 |

| ESTIMATED SHIP LENGTH $L_s$ [m] | 9.4 | 9.8 | 10.3 | 11.4 | 12.5 | 13.7 | 14.8 | 15.9 | 18 | 20.6 |
|---|---|---|---|---|---|---|---|---|---|---|
| SCALE CONVERSION COEFFICIENT $S_c$ | 3.07 | 3.13 | 3.21 | 3.38 | 3.54 | 3.70 | 3.85 | 3.99 | 4.24 | 4.54 |

43

GRADIENT DATA

| ENGINE ROTATIONAL SPEED [rpm] | 700 | 1000 | 2000 | 3000 | 4000 | 5000 | 6000 |
|---|---|---|---|---|---|---|---|
| CHANGE AMOUNT PER SECOND B [rpm] | −11 | −22 | −36.3 | −48.4 | −72.6 | −88 | −90 |

MARINE VESSEL PROPULSION CONTROL SYSTEM

CROSS-REFERENCE TO RELATED APPLICATIONS

This application is based on and claims priority under 35 USC 119 from Japanese Patent Application No. 2023-091675 filed on Jun. 2, 2023, the entire content of which is incorporated herein by reference.

BACKGROUND

The present invention relates to a marine vessel (ship) propulsion control system that controls propulsion of a marine vessel.

In a marine vessel, an outboard motor, an operation device that operates the outboard motor, and a control device that controls the outboard motor based on an operation of the operation device are provided. Thus, the outboard motor can be operated in accordance with the operation of the operation device by a crew member of the marine vessel to control propulsion of the marine vessel.

The outboard motor includes an engine, a throttle device that adjusts an inflow amount of combustion air into the engine, a propeller that converts power of the engine into a propulsive force of the marine vessel, a power transmission mechanism that transmits the power of the engine to the propeller, and a shift device that switches states of the power transmission mechanism.

The throttle device includes a throttle valve, and adjusts the inflow amount of the combustion air into the engine by changing an opening degree of the throttle valve. In addition, the throttle device is an electronically controlled throttle device, and changes the opening degree of the throttle valve based on an electric signal from the control device.

The power transmission mechanism includes a drive shaft that rotates by the power of the engine, a propeller shaft to which the propeller is fixed, and a gear mechanism that transmits rotation of the drive shaft to the propeller shaft. The gear mechanism includes a drive gear, a forward gear, a reverse gear, and a clutch. The drive gear is fixed to an end portion of the drive shaft, the forward gear meshes with the drive gear to rotate in a first direction by receiving rotation of the drive gear, and the reverse gear meshes with the drive gear to rotate in the a second direction by receiving rotation of the drive gear. The second direction is opposite to the first direction. The clutch transmits rotation of the forward gear or the reverse gear to the propeller shaft by being connected to either the forward gear or the reverse gear based on control of the shift device.

The states of the power transmission mechanism include a disconnection state, a forward connection state, and a reverse connection state. The disconnection state is a state in which the clutch is connected to neither the forward gear nor the reverse gear. In the disconnection state, the power of the engine is not transmitted to the propeller, and therefore, the outboard motor does not generate the propulsive force of the marine vessel. The forward connection state is a state in which the clutch is connected to the forward gear. In the forward connection state, the power of the engine is transmitted to the propeller via the forward gear, and therefore, the propeller rotates in the first direction. Accordingly, a propulsive force for pushing the marine vessel forward is generated by the outboard motor. The reverse connection state is a state in which the clutch is connected to the reverse gear. In the reverse connection state, the power of the engine is transmitted to the propeller via the reverse gear, and therefore, the propeller rotates in the second direction. Accordingly, a propulsive force that pushes the marine vessel rearward is generated by the outboard motor.

The shift device switches the state of the power transmission mechanism to the disconnection state, the forward connection state, or the reverse connection state by moving the clutch of the gear mechanism. In addition, the shift device is an electronically controlled shift device, and moves the clutch based on an electric signal from the control device.

The operation device is, for example, a remote control device that remotely operates the outboard motor. The operation device includes an operation lever. Positions of the operation lever include a neutral position, a forward position, and a reverse position. For example, a state in which the operation lever is raised vertically is a state in which the position of the operation lever is the neutral position. A state in which the operation lever is inclined forward with respect to a vertical direction and a forward inclination angle of the operation lever with respect to the vertical direction is within a predetermined angle range (for example, about 18 degrees to 85 degrees) is a state in which the position of the operation lever is the forward position. A state in which the operation lever is inclined rearward with respect to the vertical direction and a rearward inclination angle of the operation lever with respect to the vertical direction is within a predetermined angle range (for example, about 18 degrees to 65 degrees) is a state in which the position of the operation lever is the reverse position.

The control device electrically controls the throttle device of the outboard motor based on the position of the operation lever. Specifically, when the position of the operation lever reaches the forward position or the reverse position, the control device controls the throttle device to open the throttle valve. In addition, the control device increases the opening degree of the throttle valve as the inclination angle of the operation lever at the forward position or the reverse position increases. In addition, when the position of the operation lever reaches a position that is neither the forward position nor the reverse position, for example, when the position of the operation lever falls within a range in which the forward inclination angle of the operation lever with respect to the vertical direction is less than 18 degrees and the rearward inclination angle of the operation lever with respect to the vertical direction is less than 18 degrees, the control device controls the throttle device to fully close the throttle valve.

In addition, the control device electrically controls the shift device of the outboard motor based on the position of the operation lever. Specifically, when the position of the operation lever reaches the neutral position, the control device controls the shift device to bring the power transmission mechanism into the disconnection state. In addition, when the operation lever is inclined forward from the neutral position, the control device controls the shift device to bring the power transmission mechanism into the forward connection state. In addition, when the operation lever is inclined rearward from the neutral position, the control device controls the shift device to bring the power transmission mechanism into the reverse connection state.

At the time of causing the marine vessel to travel forward, the crew member inclines the operation lever forward to set the position of the operation lever to the forward position. At the time of stopping the marine vessel traveling forward, the crew member generally changes the position of the operation lever from the forward position to the neutral position. In a process of changing the position of the operation lever from the forward position to the neutral position, the throttle valve becomes a fully closed state when the position of the operation lever is no longer the forward position, and subsequently, the state of the power transmission mechanism becomes the disconnection state when the position of the operation lever becomes the neutral position. As a result, the propulsive force of the marine vessel is not generated by the outboard motor. However, the marine vessel continues to travel forward for a certain period of time by an inertial force.

In order to suddenly stop the marine vessel traveling forward, the crew member may change the position of the operation lever from the forward position to the neutral position and subsequently change the position of the operation lever to the reverse position. When the position of the operation lever becomes the reverse position, the state of the power transmission mechanism becomes the reverse connection state, and the throttle valve is opened. As a result, a propulsive force that pushes the marine vessel rearward is generated by the outboard motor. By applying a propulsive force in a direction opposite to a direction of the inertial force acting on the marine vessel, the marine vessel can be stopped in a short period of time.

However, the state of the power transmission mechanism is suddenly changed from the forward connection state to the reverse connection state by such an operation of the operation lever, and the throttle valve is opened immediately after that. As a result, a large load is applied to the power transmission mechanism, the engine, and the like, which may cause engine stall or damage to the gear mechanism or the like.

An outboard motor control device described in JP2018-192976A performs, at the time of sequentially switching a state of a power transmission mechanism to a forward connection state, a disconnection state, and a reverse connection state based on a case where a position of an operation lever is sequentially changed to a forward position, a neutral position, and a reverse position when a marine vessel is traveling forward, a process of delaying a timing at which the disconnection state is switched to the reverse connection state. Hereinafter, this process is referred to as a "reverse connection switching delay process". According to JP2018-192976A, it is possible to suppress a large load from being applied to the power transmission mechanism, the engine, and the like by the reverse connection switching delay process.

The control device performs the reverse connection switching delay process as follows. First, in a process of changing the position of the operation lever from the forward position to the neutral position, the control device acquires an engine rotational speed when the throttle valve is in the fully closed state but the state of the power transmission mechanism is not yet switched from the forward connection state to the disconnection state. Further, the acquired engine rotational speed is used as a reference value for estimating an actual marine vessel speed of the marine vessel. In JP2018-192976A, this reference value is referred to as a "simulated ship speed". Next, the simulated ship speed is decreased together with elapse of time using a preset attenuation gain. Further, when the position of the operation lever is changed from the neutral position to the reverse position before the simulated ship speed becomes equal to or less than a predetermined threshold, the state of the power transmission mechanism is switched from the disconnection state to the reverse connection state after waiting for the simulated ship speed to become equal to or less than the predetermined threshold. Accordingly, a switching timing of the state of the power transmission mechanism can be delayed so that the state of the power transmission mechanism is switched from the disconnection state to the reverse connection state after the actual ship speed of the marine vessel is sufficiently decreased. Therefore, it is possible to prevent a behavior that the throttle valve opens from occurring immediately after the state of the power transmission mechanism is suddenly changed from the forward connection state to the reverse connection state. Accordingly, it is possible to suppress a large load from being applied to the power transmission mechanism, the engine, and the like.

SUMMARY

It has been found that when the control device described in JP2018-192976A is provided in each of a plurality of marine vessels having different ship lengths and the reverse connection switching delay process is performed, the timing at which the state of the power transmission mechanism is switched from the disconnection state to the reverse connection state is deviated among the plurality of marine vessels.

In a case where the timing at which the state of the power transmission mechanism is switched from the disconnection state to the reverse connection state is earlier than an assumed appropriate timing in the reverse connection switching delay process, the state of the power transmission mechanism is switched from the disconnection state to the reverse connection state and the throttle valve is opened in a state in which the actual ship speed is not sufficiently decreased, and it may be impossible to suppress a large load from being applied to the power transmission mechanism, the engine, and the like. On the other hand, in a case where the timing at which the state of the power transmission mechanism is switched from the disconnection state to the reverse connection state is later than the assumed appropriate timing in the reverse connection switching delay process, the state of the power transmission mechanism is not switched from the disconnection state to the reverse connection state even though the actual ship speed is sufficiently decreased, and the operation of the outboard motor may be unnecessarily dull.

In one aspect of the invention there is to provide a marine vessel propulsion control system capable of preventing, even when being applied to a plurality of marine vessels having different ship lengths, a timing at which a state of a power transmission mechanism is switched from a disconnection state to a reverse connection state from being deviated among the marine vessels in a reverse connection switching delay process.

According to one aspect of the invention, there is provided a marine vessel propulsion control system, including:

an outboard motor provided in a marine vessel;

an operation part configured to operate the outboard motor; and a control device configured to control the outboard motor based on an operation of the operation part, wherein the outboard motor includes an engine, a throttle valve configured to adjust an inflow amount of combustion air into the engine, a propeller configured to convert power of the engine into a propulsive force of the marine vessel, a power transmission mechanism configured to transmit the power of the engine to the propeller, and a shift device configured to switch a state of the power transmission mechanism, the shift device is configured to switch the state of the power transmission mechanism to a disconnection state in which the propulsive force of the marine vessel is not generated, a forward connection state in which a propulsive force for pushing the marine vessel forward is generated, or a reverse connection state in which a propulsive force for pushing the marine vessel rearward is generated, the control device includes a simulated ship speed calculator and a shift controller, the simulated ship speed calculator is configured to calculate a simulated ship speed by multiplying an engine rotational speed when the marine vessel travels forward in a propeller co-rotating state due to the throttle valve changing from an open state to a fully closed state and the state of the power transmission mechanism continues the forward connection state by a scale conversion coefficient corresponding to a ship length of the marine vessel, and to decrease the simulated ship speed based on gradient data indicating a predetermined decrease gradient together with elapse of time from a time point at which the simulated ship speed is calculated, the shift controller is configured to when the position of the operation part is changed from the forward position to the neutral position, switch the state of the power transmission mechanism from the forward connection state to the disconnection state by controlling the shift device, in a case where the simulated ship speed is equal to or less than a predetermined simulated ship speed threshold when the position of the operation part is changed from the forward position to the neutral position and is subsequently changed to the reverse position, immediately switch the state of the power transmission mechanism from the disconnection state to the reverse connection state by controlling the shift device, and in a case where the simulated ship speed is not equal to or less than the predetermined simulated ship speed threshold when the position of the operation part is changed from the forward position to the neutral position and is subsequently changed to the reverse position, switch the state of the power transmission mechanism from the disconnection state to the reverse connection state by controlling the shift device after waiting for the simulated ship speed to become equal to or less than the simulated ship speed threshold.

According to one aspect of the invention, even when the marine vessel propulsion control system is applied to a plurality of marine vessels having different ship lengths, it is possible to prevent the timing at which the state of the power transmission mechanism is switched from the disconnection state to the reverse connection state from deviating among the marine vessels in the reverse connection switching delay process.

BRIEF DESCRIPTION OF DRAWINGS

FIG. 5 is a diagram illustrating a ship length estimation map, a scale conversion coefficient determination map, and gradient data stored in a storage of a boat control module (BCM) in FIG. 1.

DETAILED DESCRIPTION OF EXEMPLIFIED EMBODIMENTS

Figure 1:
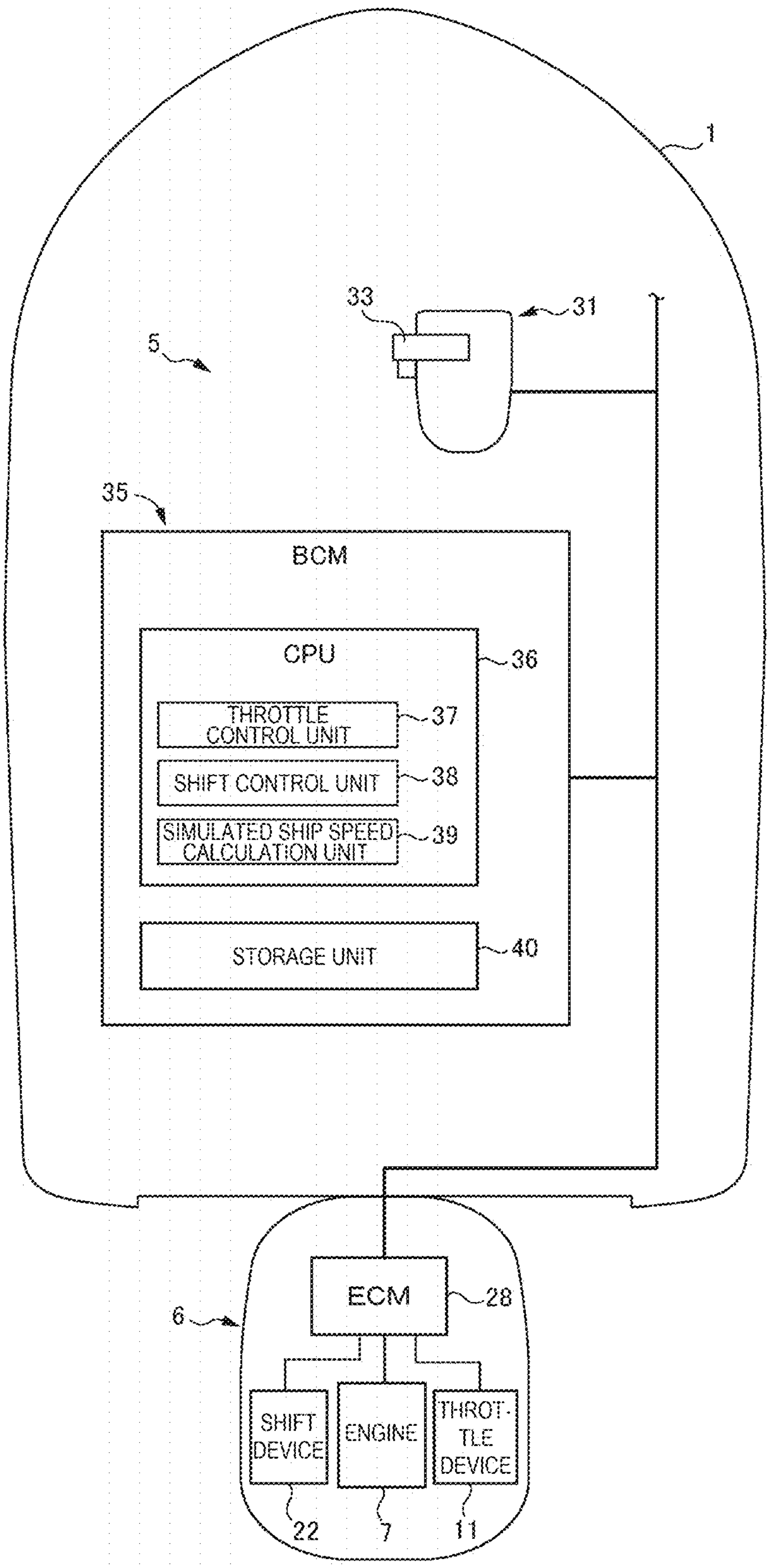
FIG. 1 is a diagram illustrating a marine vessel provided with a marine vessel propulsion control system according to an example of the present invention.

A marine vessel propulsion control system according to an embodiment of the present invention includes an outboard motor provided in a marine vessel, an operation part configured to operate the outboard motor, and a control device configured to control the outboard motor based on an operation of the operation part.

The outboard motor includes an engine, a throttle valve configured to adjust an inflow amount of combustion air into the engine, a propeller configured to convert power of the engine into a propulsive force of the marine vessel, a power transmission mechanism configured to transmit the power of the engine to the propeller, and a shift device configured to switch states of the power transmission mechanism.

The shift device is configured to switch the state of the power transmission mechanism to a disconnection state in which the propulsive force of the marine vessel is not generated, a forward connection state in which a propulsive force for pushing the marine vessel forward is generated, or a reverse connection state in which a propulsive force for pushing the marine vessel rearward is generated.

The control device includes a simulated ship speed calculator and a shift controller. The simulated ship speed calculator is configured to calculate a simulated ship speed by multiplying an engine rotational speed when the marine vessel travels forward in a propeller co-rotating state due to the throttle valve changing from an open state to a fully closed state and the state of the power transmission mechanism continues the forward connection state by a scale conversion coefficient corresponding to a ship length of the marine vessel, and to decrease the simulated ship speed based on gradient data indicating a predetermined decrease gradient together with elapse of time from a time point at which the simulated ship speed is calculated.

The shift controller is configured to, when the position of the operation part is changed from the forward position to the neutral position, switch the state of the power transmission mechanism from the forward connection state to the disconnection state by controlling the shift device. In a case where the simulated ship speed is equal to or less than a predetermined simulated ship speed threshold when the position of the operation part is changed from the forward position to the neutral position and is subsequently changed to the reverse position, the shift controller is configured to immediately switch the state of the power transmission mechanism from the disconnection state to the reverse connection state by controlling the shift device. In a case where the simulated ship speed is not equal to or less than the predetermined simulated ship speed threshold when the position of the operation part is changed from the forward position to the neutral position and is subsequently changed to the reverse position, the shift controller is configured to switch the state of the power transmission mechanism from the disconnection state to the reverse connection state by controlling the shift device after waiting for the simulated ship speed to become equal to or less than the simulated ship speed threshold.

In the marine vessel propulsion control system according to the embodiment of the present invention, the simulated ship speed calculator is configured to calculate a simulated ship speed by multiplying an engine rotational speed when the marine vessel travels forward in a propeller co-rotating state and the state of the power transmission mechanism continues the forward connection state by a scale conversion coefficient corresponding to a ship length of the marine vessel, and to decrease the simulated ship speed based on gradient data indicating a predetermined decrease gradient together with elapse of time from a time point at which the simulated ship speed is calculated. Further, the shift controller is configured to, in a case where the simulated ship speed is not equal to or less than the predetermined simulated ship speed threshold when the position of the operation lever is changed from the forward position to the neutral position and is subsequently changed to the reverse position, switch the state of the power transmission mechanism from the disconnection state to the reverse connection state after waiting for the simulated ship speed to become equal to or less than the simulated ship speed threshold.

Accordingly, in a case where the marine vessel propulsion control system is applied to a plurality of marine vessels having different ship lengths, the state of the power transmission mechanism is switched from the disconnection state to the reverse connection state before the actual ship speed sufficiently decreases when the position of the operation lever is sequentially changed to the forward position, the neutral position, and the reverse position in each of the plurality of marine vessels, and the throttle valve is opened, so that it is possible to prevent a large load from being applied to the power transmission mechanism, the engine, and the like. In addition, when the position of the operation lever is sequentially changed to the forward position, the neutral position, and the reverse position in each of the plurality of marine vessels having different ship lengths, the state of the power transmission mechanism is not switched from the disconnection state to the reverse connection state even though the actual ship speed is sufficiently decreased, so that it is possible to suppress the operation of the outboard motor from being unnecessarily dull.

(Marine Vessel and Marine Vessel Propulsion Control System)

FIG. 1 illustrates a marine vessel 1 provided with a marine vessel propulsion control system 5 according to an example of the present invention. In FIG. 1, the marine vessel 1 is, for example, a small-sized marine vessel such as a boat or a medium-sized marine vessel. The marine vessel 1 is provided with the marine vessel propulsion control system 5 that controls propulsion of the marine vessel.

The marine vessel propulsion control system 5 includes an outboard motor 6, a remote control device 31, and a boat control module (BCM) 35. The outboard motor 6 is a marine vessel propulsion device that generates a propulsive force of the marine vessel 1. The outboard motor 6 is attached to a center in a left-right direction of a stern of a hull of the marine vessel 1, and is disposed outside the hull. The remote control device 31 is an operation device that remotely operates the outboard motor 6. The remote control device 31 is disposed, for example, in a cockpit of the marine vessel 1. The BCM 35 is a device for performing comprehensive control of the marine vessel 1, control for establishing cooperation among a plurality of devices provided in the marine vessel 1, and the like. In the present example, the BCM 35 controls the outboard motor 6 based on an operation of the remote control device 31. The BCM 35 is disposed, for example, near the cockpit of the marine vessel 1. The engine control module (ECM) of the outboard motor 6, the remote control device 31, and the BCM 35 are communicably connected to one another via a network formed in the marine vessel 1. The BCM 35 is a specific example of the "control device".

The example illustrated in FIG. 1 is an example in which the marine vessel propulsion control system 5 is applied to the marine vessel 1 provided with one outboard motor 6, but the marine vessel propulsion control system 5 can also be applied to a marine vessel provided with a plurality of outboard motors 6, that is, a multiple outboard motor-installed marine vessel. When the marine vessel propulsion control system 5 is applied to a marine vessel provided with a plurality of outboard motors 6, the marine vessel propulsion control system 5 includes the plurality of outboard motors 6 provided in the marine vessel.

(Outboard Motor)

Figure 2:
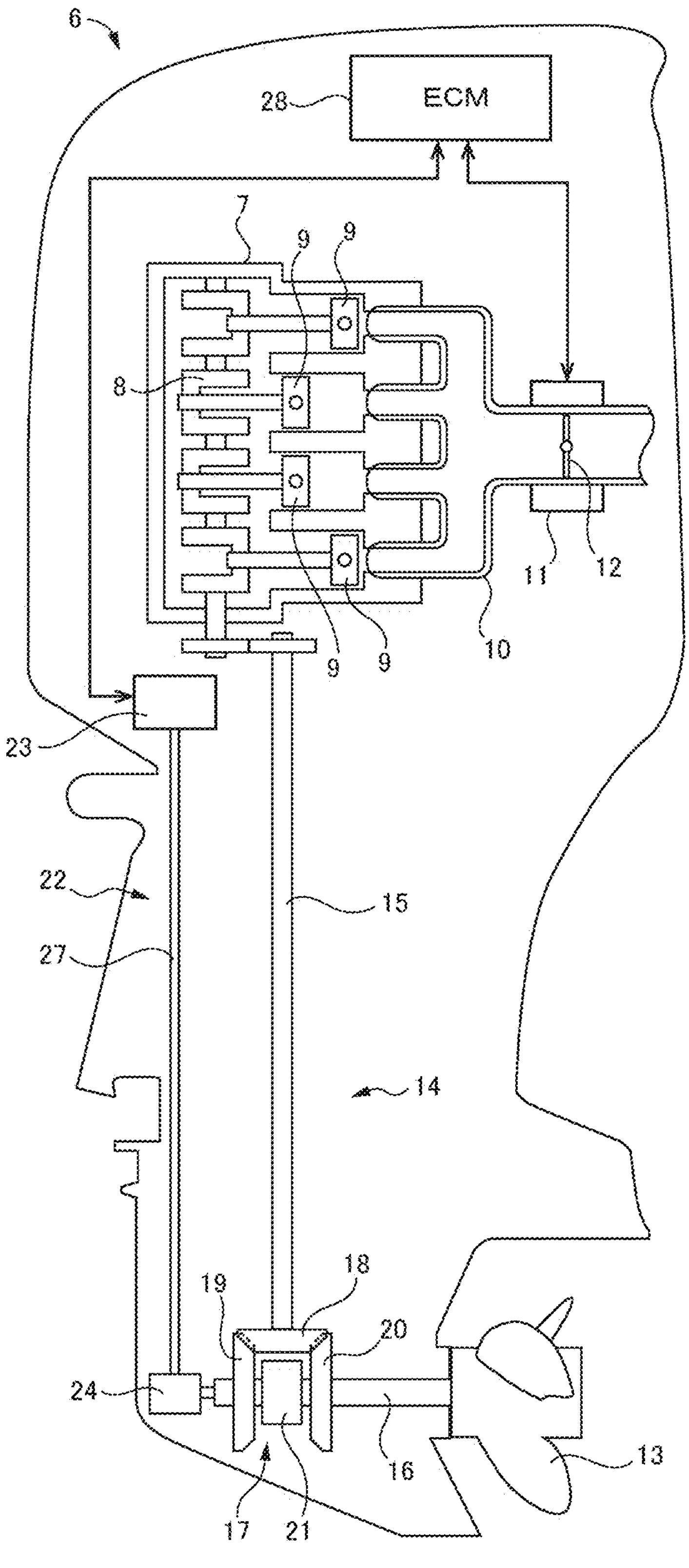
FIG. 2 is a diagram schematically illustrating a structure of an outboard motor in FIG. 1.
Figure 3:
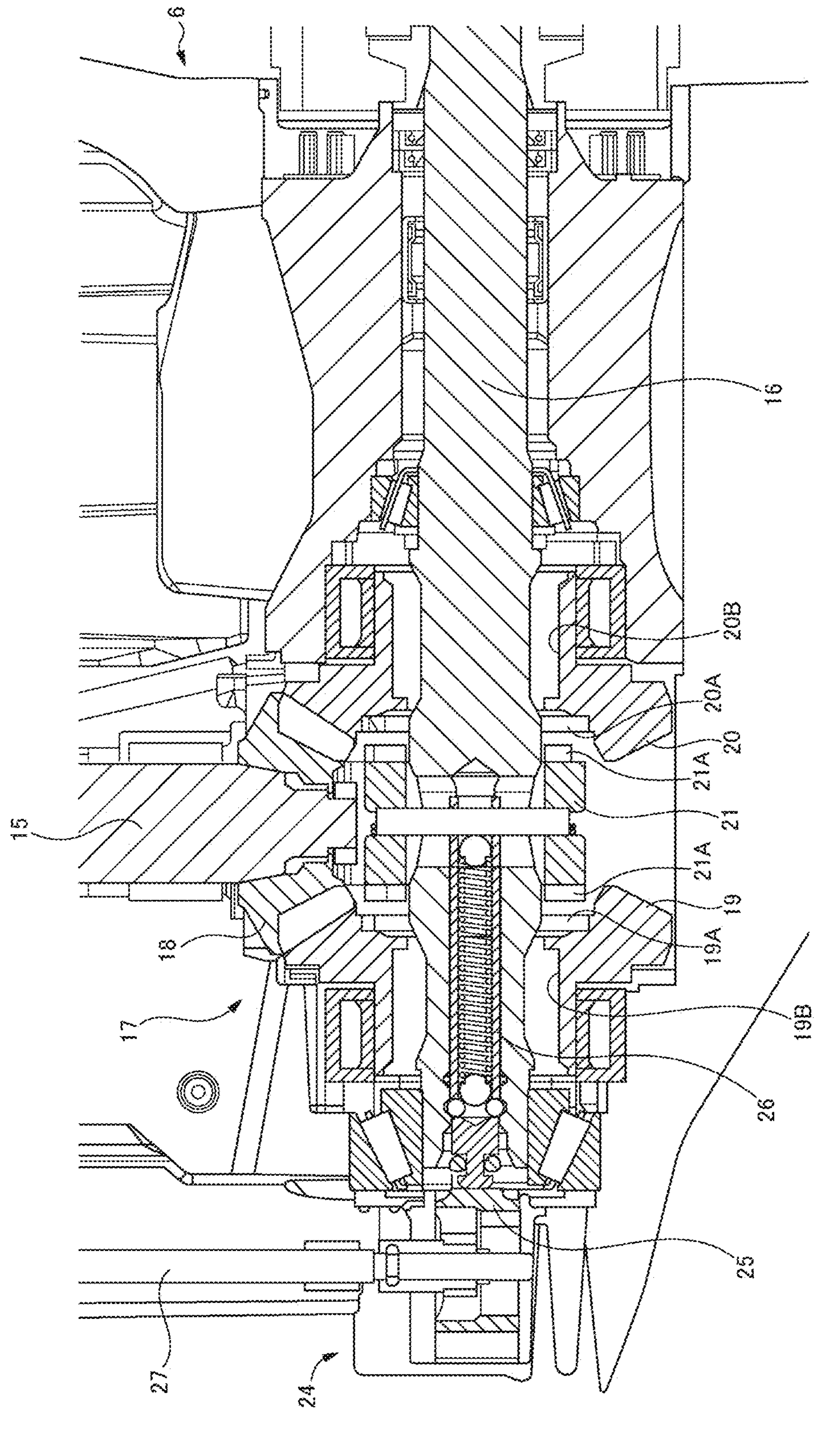
FIG. 3 is a cross-sectional view illustrating a gear mechanism of the outboard motor in FIG. 1 and a peripheral portion thereof.

FIG. 2 schematically illustrates a structure of the outboard motor 6. FIG. 3 illustrates a gear mechanism 17 of the outboard motor 6 and a peripheral portion thereof. In FIG. 2, the outboard motor 6 includes an engine 7, a throttle device 11, a propeller 13, a power transmission mechanism 14, a shift device 22, and an ECM 28.

The engine 7 is a power source that generates a propulsive force, and includes a crankshaft 8 and pistons 9. The engine 7 is disposed at an upper portion of the outboard motor 6, which is located above a water surface in the outboard motor 6.

The throttle device 11 is a device that includes a throttle valve 12 and that adjusts an inflow amount of combustion air into a combustion chamber of the engine 7 by opening and closing the throttle valve 12. The throttle device 11 according to the present example is an electronically controlled throttle device. An intake manifold 10 for allowing the combustion air to flow into the combustion chamber of the engine 7 is connected to the engine 7, and the throttle device 11 is attached to the intake manifold 10. The throttle valve 12 is disposed in an inflow pipe of the intake manifold 10. When the throttle valve 12 is in a fully closed state, a rotational speed of the engine 7 is an idling rotational speed. Even when the throttle valve 12 is in the fully closed state, the combustion air required to maintain the rotational speed of the engine 7 at the idling rotational speed is supplied into the combustion chamber. As the opening degree of the throttle valve 12 increases, the rotational speed of the engine 7 increases.

The propeller 13 is a device that converts the power of the engine 7 into the propulsive force of the marine vessel 1, and is disposed at a rear portion of a lower portion of the outboard motor 6, which is located below the water surface in the outboard motor 6.

The power transmission mechanism 14 is a mechanism that transmits the power of the engine 7 to the propeller 13. The power transmission mechanism 14 includes a drive shaft 15, a propeller shaft 16, and the gear mechanism 17. The gear mechanism 17 includes a drive gear 18, a forward gear 19, a reverse gear 20, and a dog clutch 21.

The drive shaft 15 extends in an upper-lower direction in the outboard motor 6, an upper end portion of the drive shaft 15 is connected to the crankshaft 8 of the engine 7, and the drive gear 18 is fixed to a lower end portion of the drive shaft 15. The drive shaft 15 rotates by receiving the power of the engine 7, and the drive gear 18 rotates accordingly.

The drive gear 18, the forward gear 19, and the reverse gear 20 are all bevel gears. The drive gear 18 is disposed such that an extension direction of a rotation shaft thereof is the upper-lower direction, whereas the forward gear 19 and the reverse gear 20 are disposed such that each of extension directions of rotation shafts thereof is a front-rear direction. The forward gear 19 and the reverse gear 20 are coaxially disposed to face each other, the forward gear 19 meshes with the drive gear 18 at a position in front of the drive shaft 15, and the reverse gear meshes with the drive gear 18 at a position behind the drive shaft 15. Therefore, as the drive gear 18 rotates, the forward gear 19 and the reverse gear 20 rotate in opposite directions.

The propeller shaft 16 is disposed at a lower portion of the outboard motor 6 and extends in the front-rear direction, and the propeller 13 is fixed to a rear end portion of the propeller shaft 16. As illustrated in FIG. 3, a front end portion of the propeller shaft 16 is inserted in a non-contact state into through holes 19B and 20B provided at centers of the forward gear 19 and the reverse gear 20, respectively, and neither the forward gear 19 nor the reverse gear 20 is fixed to the propeller shaft 16.

The dog clutch 21 is disposed between the forward gear 19 and the reverse gear 20. The dog clutch 21 is attached to the front end portion of the propeller shaft 16 to be immovable in a peripheral direction and movable in an axial direction with respect to the propeller shaft 16. Teeth 21A are formed on a front surface and a rear surface of the dog clutch 21, a tooth 19A is formed on an inner peripheral side portion of a rear surface of the forward gear 19, and a tooth 20A is formed on an inner peripheral side portion of a front surface of the reverse gear 20. When the dog clutch 21 is moved forward under the control of the shift device 22, the tooth 21A formed on the front surface of the dog clutch 21 meshes with the teeth 19A formed on the rear surface of the forward gear 19, and the dog clutch 21 and the forward gear 19 are connected to each other. Accordingly, the rotation of the drive shaft 15 is transmitted to the propeller shaft 16 via the forward gear 19, and the propeller shaft 16 and the propeller 13 rotate in the first direction. When the propeller 13 rotates in the first direction, a propulsive force that pushes the marine vessel 1 forward is generated. On the other hand, when the dog clutch 21 is moved rearward under the control of the shift device 22, the tooth 21A formed on the rear surface of the dog clutch 21 meshes with the tooth 20A formed on the front surface of the reverse gear 20, and the dog clutch 21 and the reverse gear 20 are connected to each other. Accordingly, the rotation of the drive shaft 15 is transmitted to the propeller shaft 16 via the reverse gear 20, and the propeller shaft 16 and the propeller 13 rotate in the second direction. The second direction is opposite to the first direction. When the propeller 13 rotates in the second direction, a propulsive force that pushes the marine vessel 1 rearward is generated. When the dog clutch 21 is located between the forward gear 19 and the reverse gear 20 under the control of the shift device 22, the dog clutch 21 is connected to neither the forward gear 19 nor the reverse gear 20. In this case, the rotation of the drive shaft 15 is not transmitted to the propeller shaft 16. Accordingly, the propulsive force is not generated by the outboard motor 6.

The states of the power transmission mechanism 14 include a disconnection state, a forward connection state, and a reverse connection state. The disconnection state is a state in which the dog clutch 21 is connected to neither the forward gear 19 nor the reverse gear 20, the power of the engine 7 is not transmitted to the propeller 13, and thus the propulsive force of the marine vessel 1 is not generated by the outboard motor 6. The forward connection state is a state in which the dog clutch 21 is connected to the forward gear 19, the power of the engine 7 is transmitted to the propeller 13 via the forward gear 19, and thus a propulsive force that pushes the marine vessel 1 forward is generated by the outboard motor 6. The reverse connection state is a state in which the dog clutch 21 is connected to the reverse gear 20, the power of the engine 7 is transmitted to the propeller 13 via the reverse gear 20, and thus a propulsive force that pushes the marine vessel 1 rearward is generated by the outboard motor 6.

The shift device 22 is a device that switches the state of the power transmission mechanism 14 to the disconnection state, the forward connection state, or the reverse connection state. The shift device 22 according to the present example is an electronically controlled shift device. The shift device 22 switches the state of the power transmission mechanism 14 by moving the dog clutch 21. As illustrated in FIG. 2, the shift device 22 includes a shift actuator 23 disposed at an upper front side of the outboard motor 6, a clutch drive mechanism 24 disposed at a lower front side of the outboard motor 6, and a shift rod 27 that extends in the upper-lower direction at a front side in the outboard motor 6 and that transmits power of the shift actuator 23 to the clutch drive mechanism 24. As illustrated in FIG. 3, the clutch drive mechanism 24 includes a cam mechanism 25 and a shift slider 26. The shift rod 27 pivots by the power of the shift actuator 23. The pivoting of the shift rod 27 is converted into a slide movement of the shift slider 26 in the front-rear direction by the cam mechanism 25, and the dog clutch 21 moves in the front-rear direction by the slide movement of the shift slider 26.

The ECM 28 is a device that controls the engine 7, and includes a central processing unit (CPU) and a storage device. Specifically, the ECM 28 outputs a valve control signal to the throttle device 11 based on a clutch control signal transmitted from the BCM 35 to change the opening degree of the throttle valve 12. The ECM 28 outputs a clutch control signal to the shift device 22 based on a shift control signal transmitted from the BCM 35, and drives the shift actuator 23 to move the dog clutch 21.

The ECM 28 has a function of transmitting throttle position information indicating a position of the throttle valve 12 to the BCM 35. That is, the throttle device 11 is provided with a throttle position sensor that detects the position of the throttle valve 12 (opening degree of the throttle valve 12), and the ECM 28 transmits the throttle position information indicating the position of the throttle valve 12 to the BCM 35 based on a detection signal output from the throttle position sensor. The ECM 28 has a function of transmitting engine rotational speed information indicating the engine rotational speed to the BCM 35. The ECM 28 has a function of transmitting horsepower information indicating horsepower of the outboard motor 6 to the BCM 35. The horsepower information is stored in the storage device of the ECM 28, for example.

The marine vessel propulsion control system 5 can also be applied to a marine vessel provided with a plurality of outboard motors 6, and when a plurality of outboard motors 6 are provided in a marine vessel, the marine vessel is generally provided with a plurality of outboard motors 6, which are the same.

(Remote Control Device)

Figure 4:
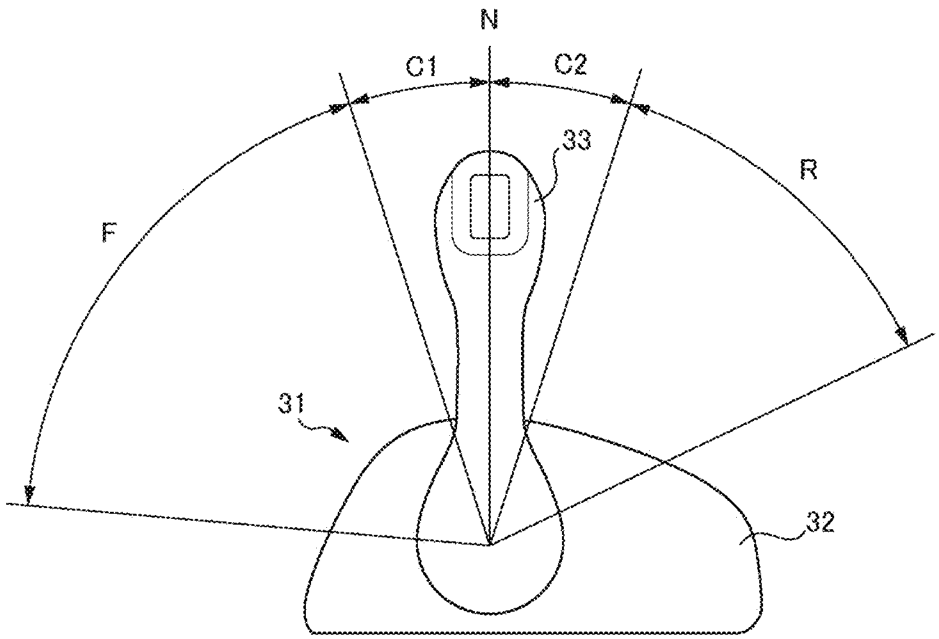
FIG. 4 is a diagram illustrating a remote control device in FIG. 1.

FIG. 4 illustrates the remote control device 31. In FIG. 4, the remote control device 31 includes a remote control device body 32 and an operation lever 33. A crew member can cause the marine vessel 1 to travel forward or rearward by inclining the operation lever 33 in a front-rear direction. The operation lever 33 is a specific example of an "operation part".

Positions of the operation lever 33 include a neutral position N, a forward position F, a reverse position R, a first fully closed position C1, and a second fully closed position C2. A state in which the operation lever 33 is vertically raised as illustrated in FIG. 4 is a state in which the position of the operation lever 33 is the neutral position N. A state in which the operation lever 33 is inclined forward and a forward inclination angle with respect to the vertical direction is, for example, 18 degrees or more and 85 degrees or less is a state in which the position of the operation lever 33 is the forward position F. A state in which the operation lever 33 is inclined rearward and a rearward inclination angle with respect to the vertical direction is, for example, 18 degrees or more and 65 degrees or less is a state in which the position of the operation lever 33 is the reverse position R. A state in which the operation lever 33 is located between the neutral position N and the forward position F (that is, a state in which the forward inclination angle of the operation lever 33 with respect to the vertical direction is more than 0 degrees and less than 18 degrees) is a state in which the position of the operation lever 33 is the first fully closed position C1. A state in which the operation lever 33 is located between the neutral position N and the reverse position R (that is, a state in which the rearward inclination angle of the operation lever 33 with respect to the vertical direction is more than 0 degrees and less than 18 degrees) is a state in which the position of the operation lever 33 is the second fully closed position C2.

The remote control device 31 includes a lever position sensor that detects the position of the operation lever 33. The lever position sensor transmits an operation signal indicating the position of the operation lever 33 to the BCM 35. The operation lever 33 can pivot in a range from a position where the forward inclination angle with respect to the vertical direction is 85 degrees to a position where the rearward inclination angle with respect to the vertical direction is 65 degrees. The operation signal is a signal indicating the position of the operation lever 33 in the pivoting range of the operation lever 33.

The marine vessel propulsion control system 5 can also be applied to a marine vessel provided with a plurality of outboard motors 6, and when the marine vessel is provided with a plurality of outboard motors 6, a remote control device including a plurality of operation levers (in many cases, two operation levers) is generally used. In this case, the plurality of operation levers can be individually operated to individually control directions or magnitudes of propulsive forces generated by the plurality of outboard motors, and when the marine vessel is simply caused to travel forward, the plurality of operation levers are simultaneously inclined forward, the positions of the plurality of operation levers are respectively set to the forward position, and the forward inclination angles of the plurality of operation levers with respect to the vertical direction are made the same. When the marine vessel is simply caused to travel rearward, the plurality of operation levers are simultaneously inclined rearward, the positions of the plurality of operation levers are respectively set to the reverse positions, and the rearward inclination angles of the plurality of operation levers with respect to the vertical direction are made the same. When the marine vessel is stopped, the positions of the plurality of operation levers are generally set to neutral positions.

(BCM)

As illustrated in FIG. 1, the BCM 35 includes a CPU 36 and a storage 40. The storage includes, for example, a semi-conductor storage device. The CPU 36 functions as a throttle controller 37, a shift controller 38, and a simulated ship speed calculator 39 by reading and executing a program stored in the storage 40, for example.

The throttle controller 37 electrically controls the throttle device 11 of the outboard motor 6 via the ECM 28 based on the operation of the operation lever 33 of the remote control device 31 to change the opening degree of the throttle valve 12. Specifically, the throttle controller 37 acquires the operation signal transmitted from the lever position sensor of the remote control device 31, and transmits, to the ECM 28 of the outboard motor 6, a throttle control signal for setting the opening degree of the throttle valve 12 to an opening degree corresponding to the position of the operation lever 33 indicated by the operation signal. The ECM 28 outputs, to the throttle device 11 based on the clutch control signal transmitted from the BCM 35, a valve control signal for setting the opening degree of the throttle valve 12 to an opening degree corresponding to the position of the operation lever 33 indicated by the operation signal. Transmission of the throttle control signal from the throttle controller 37 to the ECM 28 will be described more specifically, and when the position of the operation lever 33 reaches the neutral position N, the first fully closed position C1, or the second fully closed position C2, the throttle controller 37 transmits a throttle control signal for fully closing the throttle valve 12 to the ECM 28. When the position of the operation lever 33 reaches the forward position F, the throttle controller 37 opens the throttle valve 12 and transmits, to the ECM 28, a throttle control signal for setting the opening degree of the throttle valve 12 to an opening degree corresponding to the forward inclination angle of the operation lever 33 with respect to the vertical direction. When the position of the operation lever 33 reaches the reverse position R, the throttle controller 37 opens the throttle valve 12 and transmits, to the ECM 28, a throttle control signal for setting the opening degree of the throttle valve 12 to an opening degree corresponding to the rearward inclination angle of the operation lever 33 with respect to the vertical direction.

The shift controller 38 electrically controls the shift device 22 of the outboard motor 6 via the ECM 28 based on the operation of the operation lever 33 of the remote control device 31 to move the dog clutch 21, thereby switching the state of the power transmission mechanism 14. Specifically, the shift controller 38 acquires the operation signal transmitted from the lever position sensor of the remote control device 31, and transmits, to the ECM 28 of the outboard motor 6, a shift control signal for switching the state of the power transmission mechanism 14 in accordance with the position of the operation lever 33 indicated by the operation signal. The ECM 28 outputs, to the shift device 22 based on the shift control signal transmitted from the BCM 35, a clutch control signal for switching the state of the power transmission mechanism 14 in accordance with the position of the operation lever 33 indicated by the operation signal. Transmission of the shift control signal from the shift controller 38 to the ECM 28 will be described more specifically, and when the position of the operation lever 33 reaches the neutral position N, the shift controller 38 transmits, to the ECM 28, a shift control signal for switching the state of the power transmission mechanism 14 to the disconnection state. When the position of the operation lever 33 reaches either the first fully closed position C1 or the forward position F, the shift controller 38 transmits, to the ECM 28, a shift control signal for switching the state of the power transmission mechanism 14 to the forward connection state. When the position of the operation lever 33 reaches either the second fully closed position C2 or the reverse position R, the shift controller 38 basically transmits, to the ECM 28, a shift control signal for switching the state of the power transmission mechanism 14 to the reverse connection state. However, in a reverse connection switching delay process to be described later, when the position of the operation lever 33 is changed from the forward position F to the neutral position N and then changed to the reverse position R, the shift controller 38 may delay transmission, to the ECM 28, of the shift control signal for switching the state of the power transmission mechanism 14 to the reverse connection state.

When the marine vessel propulsion control system 5 is applied to a marine vessel provided with a plurality of outboard motors 6, the throttle controller 37 can control the throttle devices 11 of the plurality of outboard motors 6 via the ECMs 28 of the plurality of outboard motors 6, respectively, based on the operation of the plurality of operation levers to change the opening degrees of the throttle valves 12 of the plurality of outboard motors 6. The shift controller 38 can control the shift devices 22 of the plurality of outboard motors 6 via the ECMs 28 of the plurality of outboard motors 6 based on the operation of the plurality of operation levers to move the dog clutches 21 of the plurality of outboard motors 6, respectively, thereby switching the states of the power transmission mechanisms 14 of the plurality of outboard motors 6.

The simulated ship speed calculator 39 calculates the simulated ship speed in the reverse connection switching delay process to be described later. As illustrated in FIG. 5, the storage 40 of the BCM 35 stores a ship length estimation map 41, a scale conversion coefficient determination map 42, and gradient data 43 used in the reverse connection switching delay process.

(Operation of Outboard Motor Based on Position of Operation Lever)

The operation of the outboard motor 6 implemented by the control of the throttle controller 37 and the shift controller 38 based on the position of the operation lever 33 is as follows.

When the position of the operation lever 33 is the neutral position N, the state of the power transmission mechanism 14 is the disconnection state and the throttle valve 12 is in the fully closed state. At this time, the power of the engine 7 is not transmitted to the propeller 13, and therefore, the propulsive force of the marine vessel 1 is not generated by the outboard motor 6. At this time, the engine rotational speed is an idling rotational speed.

When the position of the operation lever 33 is changed from the neutral position N to the first fully closed position C1, the state of the power transmission mechanism 14 is switched from the disconnection state to the forward connection state, but the throttle valve 12 remains in the fully closed state. At this time, an idling rotation force of the engine 7 is transmitted to the propeller 13 via the forward gear 19, so that the propeller 13 rotates at a low speed in the first direction. As a result, a propulsive force that pushes the marine vessel 1 forward is generated by the outboard motor 6, but the propulsive force is extremely small.

When the position of the operation lever 33 is changed from the first fully closed position C1 to the forward position F, the opening degree of the throttle valve 12 becomes an opening degree corresponding to the forward inclination angle of the operation lever 33 with respect to the vertical direction. At this time, the power transmission mechanism 14 remains in the forward connection state. At this time, the engine rotational speed increases in accordance with the forward inclination angle of the operation lever 33 at the forward position F with respect to the vertical direction. The rotational force of the engine 7 is transmitted to the propeller 13 via the forward gear 19, so that the propeller rotational speed of the propeller 13 rotating in the first direction increases with an increase in the engine rotational speed. As a result, the propulsive force that pushes the marine vessel 1 forward, which is generated by the outboard motor 6, increases.

When the position of the operation lever 33 is changed from the forward position F to the first fully closed position C1, the throttle valve 12 becomes the fully closed state. On the other hand, at this time, the state of the power transmission mechanism 14 remains in the forward connection state. At this time, the engine rotational speed becomes the idling rotational speed, and the propulsive force that pushes the marine vessel 1 forward, which is generated by the outboard motor 6, becomes extremely small.

When the position of the operation lever 33 is changed from the first fully closed position C1 to the neutral position N, the state of the power transmission mechanism 14 is switched from the forward connection state to the disconnection state. At this time, the throttle valve 12 is in the fully closed state. At this time, the power of the engine 7 is not transmitted to the propeller 13, and therefore, the propulsive force of the marine vessel 1 is not generated by the outboard motor 6. At this time, the engine rotational speed becomes the idling rotational speed.

On the other hand, when the position of the operation lever 33 is changed from the neutral position N to the second fully closed position C2, the state of the power transmission mechanism 14 is switched from the disconnection state to the reverse connection state, but the throttle valve 12 remains in the fully closed state. At this time, the idling rotation force of the engine 7 is transmitted to the propeller 13 via the reverse gear 20, so that the propeller 13 rotates at a low speed in the second direction. As a result, the propulsive force that pushes the marine vessel 1 rearward is generated by the outboard motor 6, but the propulsive force is extremely small.

When the position of the operation lever 33 is changed from the second fully closed position C2 to the reverse position R, the opening degree of the throttle valve 12 becomes an opening degree corresponding to the rearward inclination angle of the operation lever 33 with respect to the vertical direction. At this time, the state of the power transmission mechanism 14 remains in the reverse connection state. At this time, the engine rotational speed increases in accordance with the rearward inclination angle of the operation lever 33 at the reverse position R with respect to the vertical direction. The rotational force of the engine 7 is transmitted to the propeller via the reverse gear 20, so that the propeller rotational speed of the propeller 13 rotating in the second direction increases with an increase in the engine rotational speed. As a result, the propulsive force that pushes the marine vessel 1 rearward, which is generated by the outboard motor 6, increases.

When the position of the operation lever 33 is changed from the reverse position R to the second fully closed position C2, the throttle valve 12 is in the fully closed state, but the state of the power transmission mechanism 14 remains in the forward connection state. At this time, the engine rotational speed becomes the idling rotational speed, and the propulsive force that pushes the marine vessel 1 rearward, which is generated by the outboard motor 6, becomes extremely small.

When the position of the operation lever 33 is changed from the second fully closed position C2 to the neutral position N, the state of the power transmission mechanism 14 is switched from the reverse connection state to the disconnection state. At this time, the throttle valve 12 is in the fully closed state. At this time, the power of the engine 7 is not transmitted to the propeller 13, and therefore, the propulsive force of the marine vessel 1 is not generated by the outboard motor 6. At this time, the engine rotational speed becomes the idling rotational speed.

(Reverse Connection Switching Delay Process)

Figure 6:
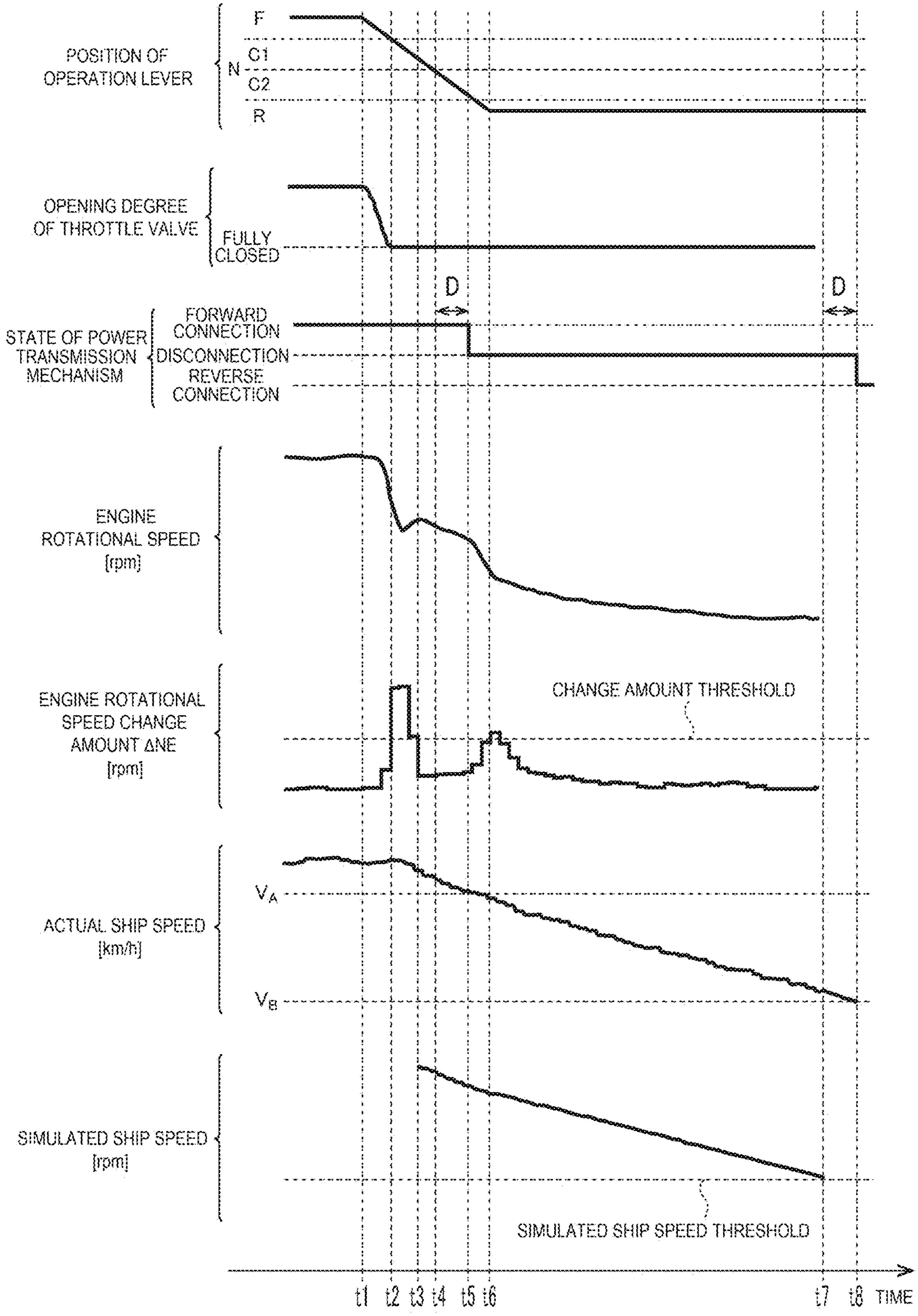
FIG. 6 is a timing chart illustrating timings of changes in a position of an operation lever, a state of a power transmission mechanism, an opening degree of a throttle valve, an engine rotational speed, an engine rotational speed change amount, an actual ship speed, and a simulated ship speed in the marine vessel propulsion control system according to the example of the present invention.

The BCM 35 of the marine vessel propulsion control system 5 performs the reverse connection switching delay process. The reverse connection switching delay process is a process of delaying a timing at which the disconnection state is switched to the reverse connection state at the time of sequentially switching the state of the power transmission mechanism to the forward connection state, the disconnection state, and the reverse connection state based on a case where the position of the operation lever is sequentially changed to the forward position, the neutral position, and the reverse position when the marine vessel is traveling forward. The reverse connection switching delay process in the marine vessel propulsion control system 5 will be described with reference to FIG. 6. FIG. 6 illustrates changes in the state of the power transmission mechanism 14, the opening degree of the throttle valve 12, the engine rotational speed, an engine rotational speed change amount ΔNE, and the actual ship speed and the simulated ship speed of the marine vessel 1 when the position of the operation lever 33 is sequentially changed to the forward position F, the neutral position N, and the reverse position R when the marine vessel 1 is traveling forward.

In FIG. 6, the position of the operation lever 33 is sequentially changed to the forward position F, the neutral position N, and the reverse position R by the operation of the operation lever 33 by the crew member of the marine vessel 1 when the marine vessel 1 is traveling forward. More specifically, the position of the operation lever 33 is sequentially changed to the forward position F, the first fully closed position C1, the neutral position N, the second fully closed position C2, and the reverse position R by the operation of the operation lever 33 by the crew member of the marine vessel 1.

At a time point before a time point t1, the position of the operation lever 33 is the forward position F, the throttle valve 12 is opened, the state of the power transmission mechanism 14 is the forward connection state, and the marine vessel 1 is traveling forward. At the time point t1, the position of the operation lever 33 starts to change from the forward position F toward the first fully closed position C1. At a time point t2, the position of the operation lever 33 reaches the first fully closed position C1. Therefore, at the time point t2, the throttle valve 12 is in the fully closed state.

Thereafter, at a time point t4 when the position of the operation lever 33 is changed from the first fully closed position C1 to the neutral position N, the BCM 35 (shift controller 38) transmits, to the ECM 28, a shift control signal for switching the state of the power transmission mechanism 14 to the disconnection state. The ECM 28 outputs a clutch control signal for switching the state of the power transmission mechanism 14 to the disconnection state to the shift device 22 based on the shift control signal transmitted from the BCM 35, and the shift device 22 switches the state of the power transmission mechanism 14 to the disconnection state based on the clutch control signal output from the ECM 28. Here, there is a slight time lag (hereinafter referred to as a "switching time lag D") until the shift device 22 switches the state of the power transmission mechanism 14 to the disconnection state after the BCM 35 transmits the shift control signal. The switching time lag D is an operation time and the like of the shift device 22 for switching the state of the power transmission mechanism 14 from the forward connection state to the disconnection state. Due to the switching time lag D, the switching of the state of the power transmission mechanism 14 to the disconnection state is completed at a time point t5.

The position of the operation lever 33 is changed from the first fully closed position C1 to the neutral position N at the time point t4, is subsequently changed from the neutral position N to the fully closed position C2, is subsequently changed from the fully closed position C2 to the reverse position R, and the operation lever 33 stops at a time point t6.

Go back in time, at the time point t1, the position of the operation lever 33 starts to change from the forward position F to the first fully closed position C1, thereafter, the opening degree of the throttle valve 12 decreases at a speed corresponding to the speed at which the position of the operation lever 33 is changed until the position of the operation lever 33 reaches the first fully closed position C1 at the time point t2, and the engine rotational speed decreases accordingly. During this period, the actual ship speed of the marine vessel 1 decreases, but a decrease gradient of the actual ship speed is smaller than a decrease gradient of the engine rotational speed. A reason is that the marine vessel 1 continues to travel forward by the inertial force.

Since the throttle valve 12 is in the fully closed state at the time point t2, the output of the engine 7 becomes extremely small, and the propulsive force that pushes the marine vessel 1 forward, which is generated by the outboard motor 6, is minimized, but the marine vessel 1 continues to travel forward by the inertial force. As a result, the propeller 13 receives a water flow and rotates. Hereinafter, a state in which the marine vessel is traveling forward in a state in which the propulsive force generated by the outboard motor is extremely small or zero, and the propeller is rotating by receiving a water flow generated by the marine vessel is referred to as a "propeller co-rotating state". There is a slight time lag (hereinafter, referred to as a "propeller co-rotation time lag") from when the throttle valve is in the fully closed state when the marine vessel is traveling forward until the rotation state of the propeller becomes the propeller co-rotating state. The propeller co-rotation time lag corresponds to a time from when the throttle valve is in the fully closed state to when the output of the engine is minimized. In the marine vessel 1 according to the present example, in FIG. 6, the rotation state of the propeller 13 becomes the propeller co-rotating state at a time point t3 after the throttle valve 12 becomes the fully closed state due to the propeller co-rotation time lag.

During a period from the time point t3 to immediately before the time point t5, the throttle valve 12 is in the fully closed state and the state of the power transmission mechanism 14 is the forward connection state. That is, during this period, the marine vessel 1 travels forward in the propeller co-rotating state, and the state of the power transmission mechanism 14 continues the forward connection state. During this period, the crankshaft 8 of the engine 7 is rotated by a rotational force of the propeller 13 that rotates by receiving the water flow. A relation between the engine rotational speed and the propeller rotational speed is determined by a gear ratio of a gear that transmits power between the crankshaft 8 and the propeller shaft 16, and the relation between the engine rotational speed and the propeller rotational speed is a proportional relation. Therefore, when the crankshaft 8 rotates by the rotational force of the propeller 13 that rotates by receiving the water flow, the engine rotational speed becomes a rotational speed proportional to the propeller rotational speed.

Here, a relation between the propeller rotational speed and the actual ship speed in the propeller co-rotating state is closer to a proportional relation than a relation between the propeller rotational speed and the actual ship speed in a state in which the throttle valve is opened and the propeller is rotated by the power of the engine. A reason is that a slip between the propeller and the surrounding water is less in the propeller co-rotating state than in a state in which the throttle valve is opened and the propeller is rotated by the power of the engine. Therefore, during a period from the time point t3 to immediately before the time point t5, the propeller rotational speed and the engine rotational speed proportional to the propeller rotational speed decrease substantially in proportion to the actual ship speed of the marine vessel that gradually decreases due to the water resistance while traveling forward by the inertial force.

Thereafter, the state of the power transmission mechanism 14 is switched from the forward connection state to the disconnection state at the time point t5, so that the rotational force of the propeller 13 rotating by receiving the water flow is not transmitted to the crankshaft 8 of the engine 7, and therefore, the engine rotational speed becomes the idling rotational speed, and the substantially proportional relation between the engine rotational speed and the actual ship speed is cancelled.

Next, go back in time, after the throttle valve becomes the fully closed state at the time point t2, the BCM 35 determines whether the rotation state of the propeller 13 is the propeller co-rotating state based on the engine rotational speed change amount ΔNE which is the change amount per unit time of the engine rotational speed. Specifically, the BCM 35 determines whether the engine rotational speed change amount ΔNE becomes equal to or less than a predetermined change amount threshold for the first time after the throttle valve 12 becomes the fully closed state at the time point t2. Then, the BCM 35 determines that the rotation state of the propeller 13 is the propeller co-rotating state when the engine rotational speed change amount ΔNE becomes equal to or less than the predetermined change amount threshold for the first time after the throttle valve 12 becomes the fully closed state at the time point t2. A principle of this determination method is as follows.

In the propeller co-rotating state, the engine rotational speed decreases substantially in proportion to the actual ship speed of the marine vessel that gradually decreases due to water resistance while traveling forward by the inertial force. Therefore, the change amount per unit time of the engine rotational speed in the propeller co-rotating state is smaller than the change amount per unit time of the engine rotational speed that changes in accordance with the change in the opening degree of the throttle valve accompanying the change in the position of the operation lever. As described above, there is a slight propeller co-rotation time lag from when the throttle valve becomes the fully closed state when the marine vessel is traveling forward until the rotation state of the propeller becomes the propeller co-rotating state. Therefore, the change amount per unit time of the engine rotational speed becomes relatively large during a period from when the throttle valve 12 is fully closed to when the rotation state of the propeller 13 becomes the propeller co-rotating state, and on the other hand, when the rotation state of the propeller 13 becomes the propeller co-rotating state, the change amount per unit time of the engine rotational speed becomes relatively small. Therefore, it is possible to determine whether the rotation state of the propeller 13 becomes the propeller co-rotating state based on whether the engine rotational speed change amount ΔNE becomes equal to or less than the predetermined change amount threshold for the first time after the throttle valve becomes the fully closed state.

The BCM 35 calculates the simulated ship speed when it is determined that the rotation state of the propeller 13 is the propeller co-rotating state at the time point t3. The simulated ship speed is a reference value for estimating the actual ship speed of the marine vessel. The BCM 35 calculates the simulated ship speed by multiplying the engine rotational speed when the marine vessel 1 travels forward in the propeller co-rotating state due to the throttle valve 12 changing from the open state to the fully closed state and the state of the power transmission mechanism 14 continues the forward connection state by a scale conversion coefficient $S_C$ corresponding to the ship length of the marine vessel 1 estimated based on the horsepower of the outboard motor 6. In a case where a plurality of outboard motors are provided in the marine vessel (in a case of multiple outboard motors being installed), the BCM calculates the simulated ship speed by multiplying the engine rotational speed when the marine vessel 1 travels forward in the propeller co-rotating state due to the throttle valve 12 changing from the open state to the fully closed state and the state of the power transmission mechanism 14 continues the forward connection state by the scale conversion coefficient $S_C$ corresponding to the ship length of the marine vessel 1 estimated based on a sum of the horsepower of the plurality of outboard motors 6.

Subsequently, the BCM 35 decreases the calculated simulated ship speed based on the gradient data 43 indicating a predetermined decrease gradient together with elapse of time from the time point t3 at which the simulated ship speed is calculated. As a result, as illustrated in FIG. 6, the simulated ship speed becomes, from the time point t3, a value that decreases at a gradient approximate to the gradient at which the actual ship speed of the marine vessel 1 decreases. A calculation principle of the simulated ship speed, a specific calculation method of the simulated ship speed, the gradient data 43, and the like will be described later.

Thereafter, when the position of the operation lever 33 reaches the reverse position R, the BCM 35 recognizes this fact. Thereafter, the BCM 35 (shift controller 38) waits until the simulated ship speed becomes equal to or less than a predetermined simulated ship speed threshold, and then transmits, to the ECM 28, a shift control signal for switching the state of the power transmission mechanism 14 to the reverse connection state. The ECM 28 outputs a clutch control signal for switching the state of the power transmission mechanism 14 to the reverse connection state to the shift device 22 based on the shift control signal transmitted from the BCM 35, and the shift device 22 switches the state of the power transmission mechanism 14 to the reverse connection state based on the clutch control signal output from the ECM 28. In FIG. 6, the simulated ship speed becomes equal to or less than the simulated ship speed threshold at a time point t7, the BCM 35 transmits the shift control signal for switching the state of the power transmission mechanism 14 to the reverse connection state to the ECM 28, and the switching of the state of the power transmission mechanism 14 to the reverse connection state is completed at a time point t8 when the switching time lag D elapses from the transmission of the shift control signal from the BCM 35.

In FIG. 6, when the state of the power transmission mechanism 14 is switched from the disconnection state to the reverse connection state by a normal switching process without performing the reverse connection switching delay process, the state of the power transmission mechanism 14 is switched from the disconnection state to the reverse connection state at a time point when the switching time lag D elapses from the time point t3. The actual ship speed at this time is $V_A$. In contrast, when the reverse connection switching delay process is executed, the state of the power transmission mechanism 14 is switched from the disconnection state to the reverse connection state at the time point t8. The actual ship speed at this time is $V_B$. As can be seen from FIG. 6, the actual ship speed sufficiently decreases from $V_A$ to $V_B$ during a period from the time point when the switching time lag D elapses from the time point t3 to the time point t8. Therefore, a magnitude of a load applied to the power transmission mechanism, the engine, and the like when the state of the power transmission mechanism 14 is switched from the disconnection state to the reverse connection state at the time point t8 and the throttle valve 12 is opened immediately thereafter is sufficiently smaller than a magnitude of the load applied to the power transmission mechanism, the engine, and the like when the state of the power transmission mechanism 14 is switched from the disconnection state to the reverse connection state at a time point when the switching time lag D elapses from the time point t3 and the throttle valve 12 is opened immediately thereafter. Therefore, it is possible to suppress a large load from being applied to the power transmission mechanism 14, the engine 7, and the like according to the reverse connection switching delay process. In addition, it is possible to prevent the operation of the outboard motor 6 from being unnecessarily dull by setting the simulated ship speed threshold to an upper limit value at which a large load can be suppressed from being applied to the power transmission mechanism 14, the engine 7, and the like or a value close to the upper limit value.

(Calculation Principle of Simulated Ship Speed)

The BCM 35 calculates the simulated ship speed by multiplying an engine rotational speed (specifically, the engine rotational speed at the time point t3 in FIG. 6) when the marine vessel 1 travels forward in the propeller co-rotating state due to the throttle valve 12 changing from the open state to the fully closed state and the state of the power transmission mechanism 14 continues the forward connection state by the scale conversion coefficient Se corresponding to the ship length of the marine vessel 1, and decreases based on the gradient data 43 indicating a predetermined decrease gradient the simulated ship speed together with elapse of time from the time point at which the simulated ship speed is calculated. Accordingly, the simulated ship speed becomes a value that decreases at a decrease gradient approximate to the decrease gradient of the actual ship speed of the marine vessel that gradually decreases due to water resistance while traveling forward by the inertial force as a result of the position of the operation lever changing from the forward position to the neutral position when the marine vessel provided with the marine vessel propulsion control system 5 is traveling forward. Hereinafter, the calculation principle of the simulated ship speed will be described.

The engine rotational speed and the actual ship speed of the marine vessel 1 when the marine vessel 1 travels forward in the propeller co-rotating state and the state of the power transmission mechanism 14 continues the forward connection state are close to a proportional relation. Therefore, the actual ship speed of the marine vessel 1 can be estimated based on the engine rotational speed. Thus, the BCM 35 uses the engine rotational speed as a basic value of the simulated ship speed.

Figure 7A:
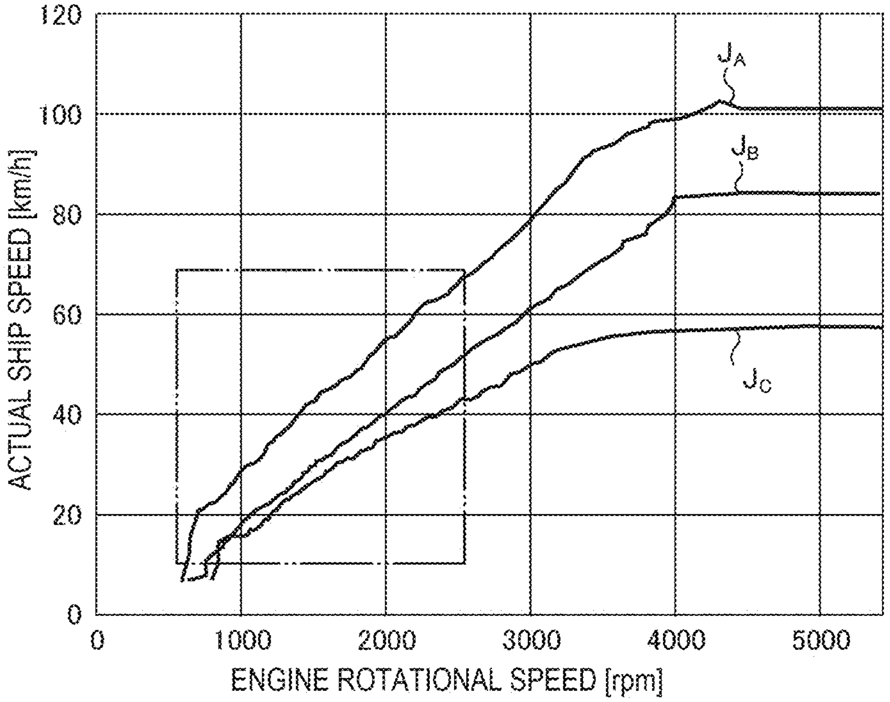
FIGS. 7A and 7B are diagrams relating to calculation of the simulated ship speed in the marine vessel propulsion control system according to the example of the present invention.

However, the engine rotational speed mainly differs depending on the ship length of the marine vessel. FIG. 7A illustrates a relation between the engine rotational speed and the actual ship speed when three marine vessels $P_A$, $P_B$, and $P_C$ having different ship lengths travel forward in the propeller co-rotating state and the state of the power transmission mechanism continues the forward connection state. Specifically, a characteristic line $J_A$ indicates a relation between the engine rotational speed and the actual ship speed for the marine vessel $P_A$ having the longest ship length among the three marine vessels, a characteristic line $J_B$ indicates a relation between the engine rotational speed and the actual ship speed for the marine vessel $P_B$ having a substantially intermediate ship length among the three marine vessels, and a characteristic line $J_C$ indicates a relation between the engine rotational speed and the actual ship speed for the marine vessel $P_C$ having the smallest ship length among the three ships. It is understood from FIG. 7A that the actual ship speed with respect to the engine rotational speed of the marine vessel $P_A$ (characteristic line $J_A$) having a long ship length is higher than that of the marine vessel $P_C$ (characteristic line $J_C$) having a short ship length.

In the present example, by decreasing the simulated ship speed based on one piece of the gradient data 43, the actual ship speed of the ship that gradually decreases due to water resistance while traveling forward by the inertial force is estimated one by one. Therefore, in a case where it is ignored that the engine rotational speed when the ship travels forward in the propeller co-rotating state and the state of the power transmission mechanism continues the forward connection state differs depending on the ship length of the ship, the accuracy of estimation on the actual ship speed of the ship that gradually decreases due to the water resistance while traveling forward by the inertial force decreases.

Thus, the BCM 35 performs scale conversion based on the Froude similarity law on the relation between the engine rotational speed and the actual ship speed when the ship travels forward in the propeller co-rotating state and the state of the power transmission mechanism continues the forward connection state, and calculates the simulated ship speed based on the relation between the engine rotational speed and the actual ship speed after the scale conversion. Specifically, the BCM 35 calculates the simulated ship speed by multiplying the engine rotational speed when the marine vessel travels forward in the propeller co-rotating state and the state of the power transmission mechanism continues the forward connection state by the scale conversion coefficient $S_C$ corresponding to the ship length of the marine vessel provided with the marine vessel propulsion control system 5.

The scale conversion coefficient $S_C$ is a scale conversion coefficient based on the Froude similarity law. The scale conversion coefficient $S_C$ is calculated by the following equation (1).

$$S_C=(L_S)^\wedge(1/2) \quad (1)$$

$S_C$: Scale Conversion Coefficient $L_S$: Estimated Ship Length

The equation (1) is generated as follows.

When the scale conversion based on the Froude similarity law is performed, the Froude number FR representing a ratio of the inertial force and the weight is set to be equal before and after the conversion. The Froude number FR is as follows.

$$F_R=(m\cdot a/m\cdot g)^\wedge(1/2) \quad (2)$$

m: Mass a: Acceleration g: Gravitational Acceleration

When the scale conversion based on the Froude similarity law is performed for the marine vessel, the equation (2) is converted as follows.

$$F_R=V/\{(L\cdot g)^\wedge(1/2)\} \quad (3)$$

V: Ship Speed

L: Ship Length

Here, there are two marine vessels $Q_A$ and $Q_B$ having different ship lengths. The ship length of the marine vessel $Q_A$ is defined as $L_A$, and the actual ship speed of the ship $Q_A$ is defined as $V_A$. The ship length of the marine vessel $Q_B$ is defined as $L_B$, and the actual ship speed of the marine vessel $Q_B$ is defined as $V_B$. When scale conversion of the actual ship speed $V_B$ of the marine vessel $Q_B$ to the actual ship speed $V_A$ of the marine vessel $Q_A$ is performed based on the Froude similarity law, the Froude number FR is made equal before and after the conversion. Therefore, the conversion is performed to satisfy the following equation.

$$V_A/\{(L_A\cdot g)^\wedge(1/2)\}=V_B/\{(L_B\cdot g)^\wedge(1/2)\} \quad (4)$$

The following equation is established from the equation (4).

$$V_A=\{(L_A/L_B)^\wedge(1/2)\}\cdot V_B \quad (5)$$

In the coefficient $\{(L_A/L_B)^\wedge(½)\}$ in the equation (5), $(L_A/L_B)$ replaced by the estimated ship length $L_S$ is the scale conversion coefficient $S_C$ according to the example of the present invention.

Figure 7B:
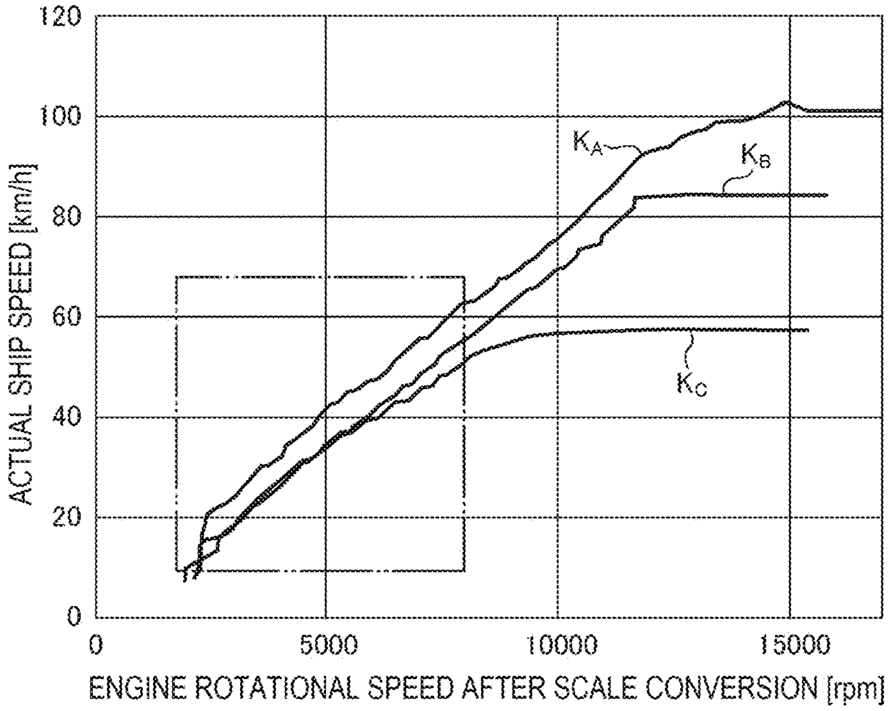

FIG. 7B illustrates a result of performing scale conversion on the relation between the engine rotational speed and the actual ship speed for each of the marine vessels $P_A$, $P_B$, and $P_C$ illustrated in FIG. 7A using the scale conversion coefficients $S_C$. Specifically, a characteristic line $K_A$ indicates a result of performing scale conversion on the relation (characteristic line $J_A$) between the engine rotational speed and the actual ship speed for the marine vessel $P_A$ illustrated in FIG. 7A using the scale conversion coefficient $S_C$. A characteristic line $K_B$ indicates a result of performing scale conversion on the relation (characteristic line $J_B$) between the engine rotational speed and the actual ship speed for the marine vessel $P_B$ illustrated in FIG. 7A using the scale conversion coefficient $S_C$. A characteristic line $K_C$ indicates a result of performing scale conversion on the relation (characteristic line $J_C$) between the engine rotational speed and the actual ship speed for the marine vessel $P_C$ illustrated in FIG. 7A using the scale conversion coefficient $S_C$. When a portion surrounded by a two-dot chain line in FIG. 7A and a portion surrounded by a two-dot chain line in FIG. 7B are compared, it can be seen that the relation between the engine rotational speed and the actual ship speed after the scale conversion has a higher consistency among the marine vessels $P_A$, $P_B$, and $P_C$ than before the scale conversion. That is, the consistency among the characteristic lines $K_A$, $K_B$, and $K_C$ illustrated in FIG. 7B is higher than the consistency among the characteristic lines $J_A$, $J_B$, and $J_C$ illustrated in FIG. 7A. Therefore, the simulated ship speed is calculated based on the relation between the engine rotational speed and the actual ship speed after the scale conversion using the scale conversion coefficient $S_C$, and the simulated ship speed is decreased based on one gradient data 43, whereby it is possible to improve the accuracy of estimation on the actual ship speed of the marine vessel which gradually decreases due to the water resistance while traveling forward by the inertial force.

The BCM 35 calculates the simulated ship speed by multiplying the engine rotational speed when the marine vessel 1 travels forward in the propeller co-rotating state and the state of the power transmission mechanism 14 continues the forward connection state by the scale conversion coefficient $S_C$ corresponding to the ship length of the marine vessel 1, and thereafter, decreases the simulated ship speed based on the gradient data 43 indicating a predetermined decrease gradient together with elapse of time from a time point at which the simulated ship speed is calculated. The predetermined decrease gradient indicated by the gradient data 43 is generated by experiment or simulation so that an error between the decrease gradient of the simulated ship speed when the simulated ship speed calculated using the scale conversion coefficient $S_C$ is decreased along the predetermined decrease gradient for each of a plurality of marine vessels having different ship lengths and the decrease gradient of the actual ship speed of the marine vessel that gradually decreases due to the water resistance while traveling forward by the inertial force becomes minimum as a result of the position of the operation lever being changed from the forward position to the neutral position when the marine vessel is traveling forward. By decreasing the simulated ship speed based on the gradient data 43, the decrease gradient of the simulated ship speed can be approximated to the decrease gradient of the actual ship speed as much as possible for each of a plurality of marine vessels having different ship lengths.

(Calculation Method of Simulated Ship Speed)

The BCM 35 calculates the simulated ship speed by multiplying the engine rotational speed when the marine vessel 1 travels forward in the propeller co-rotating state and the state of the power transmission mechanism 14 continues the forward connection state by the scale conversion coefficient $S_C$ corresponding to the ship length of the marine vessel 1. At the time of performing this calculation, the BCM 35 first estimates the ship length of the marine vessel provided with the marine vessel propulsion control system 5 based on the horsepower of the outboard motor provided in the marine vessel provided with the marine vessel propulsion control system 5. The BCM 35 uses the ship length estimation map 41 stored in the storage 40 of the BCM 35 at the time of estimating the ship length of the marine vessel provided with the marine vessel propulsion control system 5. As illustrated in FIG. 5, the ship length estimation map 41 describes a correspondence relation between the total horsepower of the outboard motor provided in the marine vessel and the estimated ship length $L_S$ which is an estimated value of the ship length of the marine vessel. When the number of outboard motors provided in the marine vessel is one, the total horsepower of the outboard motor is the horsepower of the one outboard motor, and when the number of outboard motors provided in the marine vessel is plural, the total horsepower of the outboard motor is the total horsepower of the plurality of outboard motors. For example, the BCM 35 calculates the total horsepower of the outboard motor provided in the marine vessel by multiplying the horsepower of the outboard motor provided in the marine vessel provided with the marine vessel propulsion control system 5 by the number of the outboard motor provided in the marine vessel. Then, the BCM 35 refers to the ship length estimation map 41 and determines the estimated ship length $L_S$ corresponding to the calculated total horsepower.

The BCM 35 determines the value of the scale conversion coefficient $S_C$ based on the estimated ship length $L_S$ after determining the estimated ship length $L_S$ of the marine vessel provided with the marine vessel propulsion control system 5. The BCM 35 uses the scale conversion coefficient determination map 42 stored in the storage 40 of the BCM 35 at the time of determining the value of the scale conversion coefficient $S_C$. As illustrated in FIG. 5, the scale conversion coefficient determination map 42 describes a correspondence relation between the estimated ship length $L_S$ and the value of the scale conversion coefficient $S_C$. In the scale conversion coefficient determination map 42, the values of the scale conversion coefficient $S_C$ are calculated in advance using the above equation (1). The BCM 35 refers to the scale conversion coefficient determination map 42 and determines the value of the scale conversion coefficient $S_C$ corresponding to the estimated ship length $L_S$ of the marine vessel provided with the marine vessel propulsion control system 5. Instead of using the scale conversion coefficient determination map 42, the value of the scale conversion coefficient $S_C$ may be calculated using the above equation (1) every time the estimated ship length $L_S$ is determined.

After calculating the simulated ship speed using the value of the scale conversion coefficient $S_C$ determined in this manner, the BCM 35 decreases the simulated ship speed based on the gradient data 43 indicating a predetermined decrease gradient together with the elapse of time from the time point at which the simulated ship speed is calculated. As illustrated in FIG. 5, the gradient data 43 is formed by dividing the engine rotational speed into a plurality of sections based on the magnitude of the engine rotational speed and describing a change amount B per second of the engine rotational speed for each section. The BCM 35 first stores the calculated simulated ship speed in the storage 40 of the BCM 35, and waits for a predetermined time W (for example, 0.1 seconds). Next, the BCM 35 refers to the gradient data 43, determines the change amount B corresponding to the current simulated ship speed (that is, the simulated ship speed currently stored in the storage 40), performs calculation in accordance with the following equation, overwrites the storage 40 with a new simulated ship speed obtained by the calculation, and waits for the predetermined time W.

$$SimV_N = SimV_C + B \times W \tag{6}$$

$SimV_N$: New Simulated Ship Speed
$SimV_C$: Current Simulated Ship Speed
B: Change Amount
W: Predetermined Time Thereafter, the BCM 35 repeats a series of processes of referring to the gradient data 43, determining the change amount B corresponding to the current simulated ship speed $SimV_C$, performing the calculation of the equation (6), overwriting the storage 40 with a new simulated ship speed $SimV_N$ obtained by the calculation, and waiting for the predetermined time W.

(Specific Flow of Reverse Connection Switching Delay Process)

Figure 8:
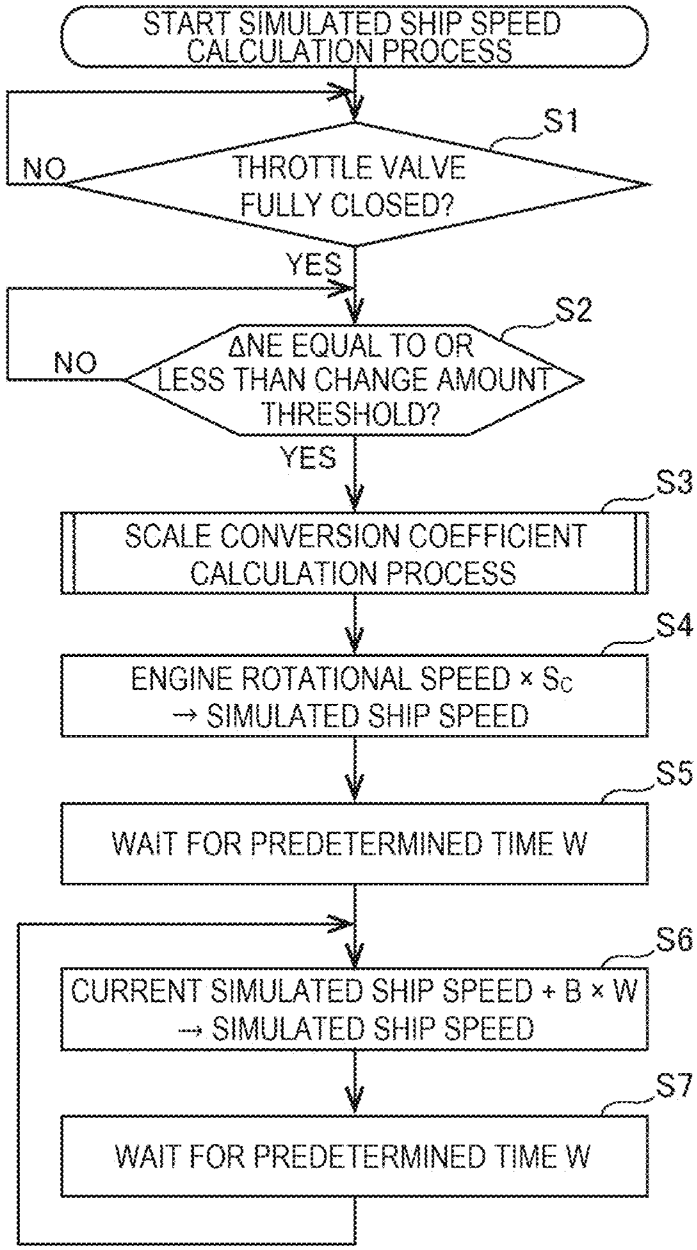
FIG. 8 is a flowchart illustrating a simulated ship speed calculation process in the marine vessel propulsion control system according to the example of the present invention.
Figure 9:
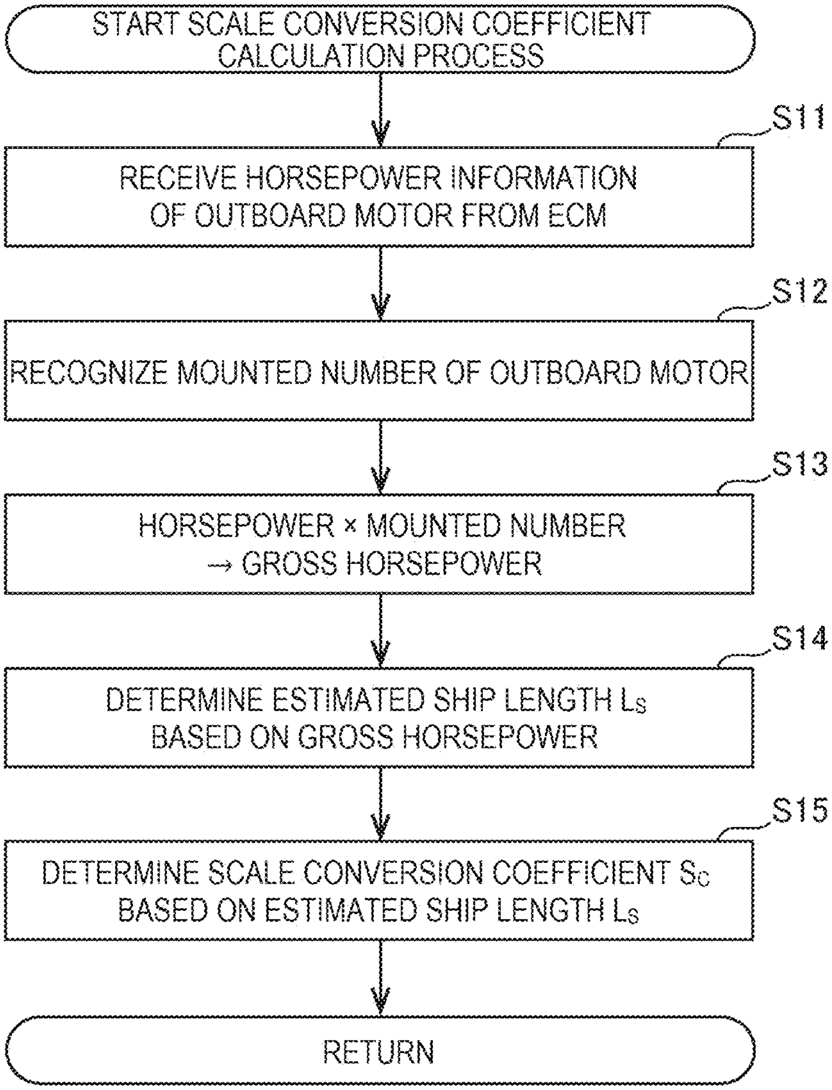
FIG. 9 is a flowchart illustrating a scale conversion coefficient calculation process in the simulated ship speed calculation process illustrated in FIG. 8.
Figure 10:
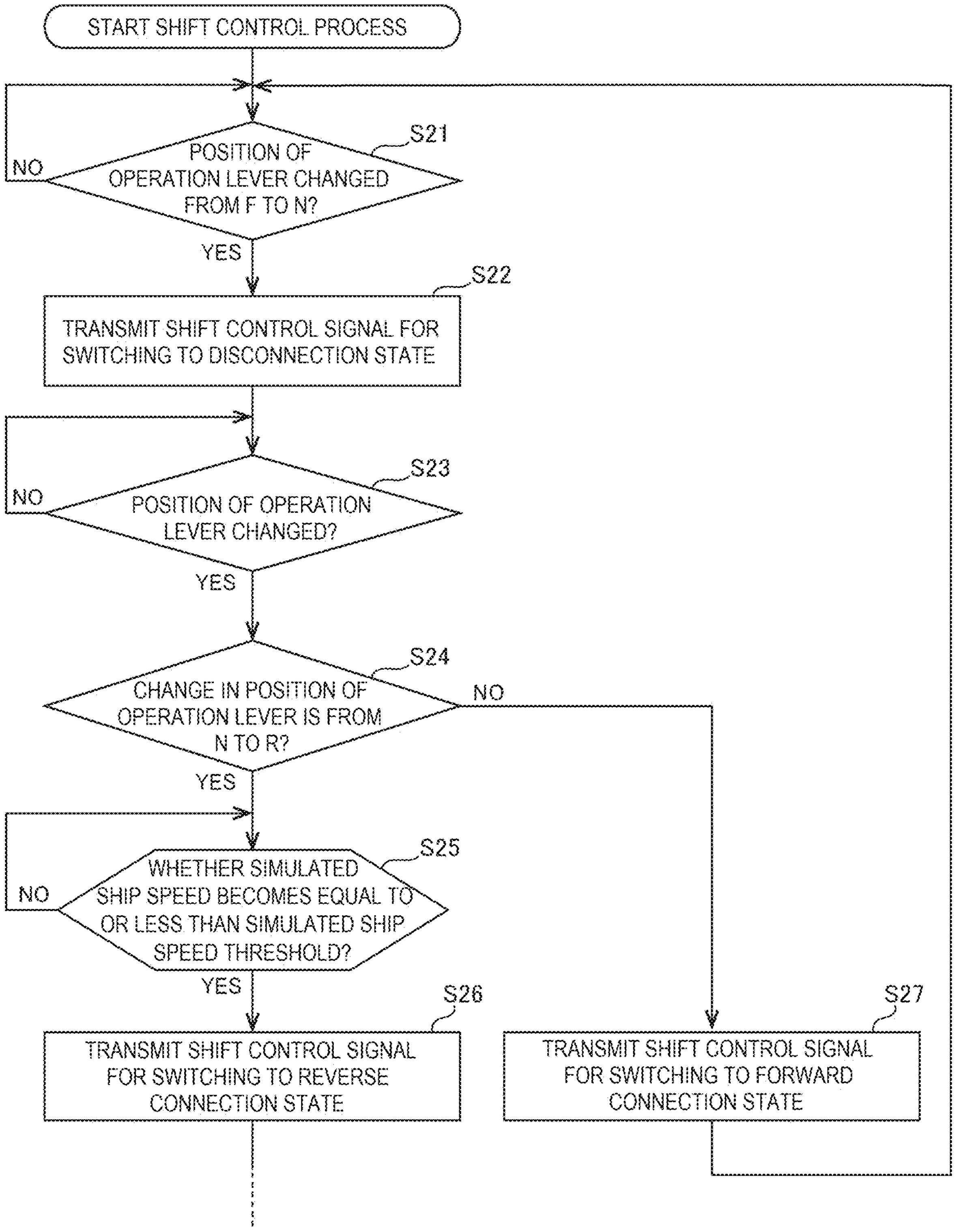
FIG. 10 is a flowchart illustrating a shift control process in the marine vessel propulsion control system according to the example of the present invention.

FIGS. 8 to 10 illustrate a specific flow of the reverse connection switching delay process. As can be seen from FIG. 6, a simulated ship speed calculation process for calculating the simulated ship speed and a shift control process for switching the state of the power transmission mechanism 14 are performed in parallel in the marine vessel propulsion control system 5. FIG. 8 illustrates the simulated ship speed calculation process, and FIG. 10 illustrates the shift control process. A scale conversion coefficient calculation process illustrated in FIG. 9 is a subroutine in the simulated ship speed calculation process illustrated in FIG. 8.

First, the simulated ship speed calculation process will be described. In FIG. 8, the simulated ship speed calculator 39 of the BCM 35 determines whether the throttle valve 12 is in the fully closed state based on the throttle position information transmitted from the ECM 28 of the outboard motor 6 (step S1). The simulated ship speed calculator 39 monitors the state of the throttle valve 12 by repeating step S1, and shifts the process to step S2 at a timing when the throttle valve becomes the fully closed state.

Subsequently, the simulated ship speed calculator 39 calculates the engine rotational speed change amount ΔNE based on the engine rotational speed information transmitted from the ECM 28, and determines whether the engine rotational speed change amount ΔNE becomes equal to or less than the change amount threshold for the first time after step S1 (step S2). The simulated ship speed calculator 39 monitors the engine rotational speed change amount ΔNE by repeating step S2, and shifts the process to step S3 at a timing when the engine rotational speed change amount ΔNE becomes equal to or less than the change amount threshold for the first time after step S1.

Subsequently, the simulated ship speed calculator 39 performs the scale conversion coefficient calculation process of calculating the scale conversion coefficient $S_C$ (step S3).

In the scale conversion coefficient calculation process illustrated in FIG. 9, the simulated ship speed calculator 39 transmits, for example, a request signal for requesting transmission of the horsepower information of the outboard motor 6 to the ECM 28, and receives the horsepower information of the outboard motor 6 transmitted from the ECM 28 in response to the request signal (step S11). When the marine vessel 1 is provided with a plurality of outboard motors 6, the horsepower of the plurality of outboard motors is generally the same, and therefore, it is sufficient to acquire the horsepower information from one outboard motor among the plurality of outboard motors 6.

Subsequently, the simulated ship speed calculator 39 recognizes the number of the outboard motor 6 provided in the marine vessel 1 (step S12). For example, the number of the outboard motor 6 provided in the marine vessel 1 is generally stored in the storage 40 of the BCM 35, and the simulated ship speed calculator 39 refers to the stored number to recognize the number of the outboard motor 6 provided in the marine vessel 1.

Subsequently, the simulated ship speed calculator 39 calculates the total horsepower of the outboard motor 6 provided in the marine vessel 1 by multiplying the horsepower of the outboard motor 6 indicated by the received horsepower information of the outboard motor 6 by the recognized number of the outboard motor 6 (step S13).

When the number of the outboard motor 6 provided in the marine vessel 1 is one, the horsepower of the outboard motor 6 indicated by the received horsepower information of the outboard motor 6 is set as the total horsepower as it is.

Subsequently, the simulated ship speed calculator 39 determines the estimated ship length $L_S$ of the marine vessel 1 using the ship length estimation map 41 based on the calculated total horsepower (step S14).

Subsequently, the simulated ship speed calculator 39 determines the scale conversion coefficient $S_C$ using the scale conversion coefficient determination map 42 based on the determined estimated ship length $L_S$ (step S15). Thereafter, the process proceeds to step S4 in FIG. 8.

The scale conversion coefficient calculation process illustrated in FIG. 9 may be performed, for example, immediately after the BCM 35 and the outboard motor 6 are powered on at the start of navigation of the marine vessel 1. In this case, the scale conversion coefficient $S_C$ determined by the scale conversion coefficient calculation process is stored in the storage of the BCM 35, for example. In step S3 in FIG. 8, the simulated ship speed calculator 39 reads the scale conversion coefficient $S_C$ from the storage 40.

Subsequently, in FIG. 8, the simulated ship speed calculator 39 acquires the engine rotational speed indicated by the engine rotational speed information transmitted from the ECM 28 after step S2. The engine rotational speed acquired at this time point is the engine rotational speed when the rotation state of the propeller is the propeller co-rotating state and the state of the power transmission mechanism 14 is the forward connection state. Then, the simulated ship speed calculator 39 calculates the simulated ship speed by multiplying the engine rotational speed by the scale conversion coefficient $S_C$ determined by the scale conversion coefficient calculation process (step S4). Subsequently, the simulated ship speed calculator 39 stores the calculated simulated ship speed in the storage 40 and waits for the predetermined time W (step S5).

Subsequently, the simulated ship speed calculator 39 refers to the gradient data 43, determines the change amount B corresponding to the current simulated ship speed, performs the calculation of the equation (6), overwrites the storage 40 with a new simulated ship speed obtained by the calculation (step S6), and waits for the predetermined time W (step S7). The simulated ship speed calculator 39 decreases the simulated ship speed based on the gradient data 43 by repeating steps S6 and S7. The simulated ship speed calculator 39 repeats steps S6 and S7 until it is determined that the position of the operation lever 33 is not sequentially changed to the forward position F, the neutral position N, and the reverse position R or until the simulated ship speed becomes equal to or less than the simulated ship speed threshold.

Next, the shift control process performed in parallel with the simulated ship speed calculation process will be described. In FIG. 10, it is assumed that the position of the operation lever 33 is the forward position F. In this case, the shift controller 38 determines whether the position of the operation lever 33 is changed from the forward position F to the neutral position N based on the operation signal transmitted from the lever position sensor of the remote control device 31 (step S21). The shift controller 38 monitors the position of the operation lever 33 by repeating step S21, and shifts the process to step S22 at a timing when the position of the operation lever 33 is changed from the forward position F to the neutral position N.

Subsequently, the shift controller 38 transmits a shift control signal for switching the state of the power transmission mechanism 14 to the disconnection state to the ECM 28 (step S22).

Subsequently, the shift controller 38 monitors a change in the position of the operation lever 33 (step S23), and when the position of the operation lever 33 is changed, determines whether the change in the position of the operation lever 33 is a change from the neutral position N to the reverse position R (step S24). In step S24, when the position of the operation lever 33 is changed from the neutral position N to the reverse position R, the position of the operation lever 33 is changed from the forward position F to the neutral position N and then changed to the reverse position R as can be seen from the processes of steps S21 to S24. In this case, the shift controller 38 determines whether the simulated ship speed is equal to or less than the simulated ship speed threshold (step S25).

When the simulated ship speed is not equal to or less than the simulated ship speed threshold, the shift controller 38 monitors the simulated ship speed by repeating step S25, and shifts the process to step S26 at a timing when the simulated ship speed becomes equal to or less than the simulated ship speed threshold.

Subsequently, the shift controller 38 transmits a shift control signal for switching the state of the power transmission mechanism 14 from the disconnection state to the reverse connection state to the ECM 28 (step S26).

On the other hand, in step S23, while the shift controller 38 monitors the change in the position of the operation lever 33, a long period of time may elapse without changing the position of the operation lever 33, and the simulated ship speed may become equal to or less than the simulated ship speed threshold during that period. In this case, thereafter, the simulated ship speed has already become equal to or less than the simulated ship speed threshold at a time point when the position of the operation lever 33 is changed from the neutral position N to the reverse position R in step S24, and therefore, the shift controller 38 immediately proceeds to step S26 and transmits the shift control signal for switching the state of the power transmission mechanism 14 from the disconnection state to the reverse connection state to the ECM 28.

On the other hand, in step S23, while the shift controller 38 monitors the change in the position of the operation lever 33, the position of the operation lever 33 is changed, and in step S24, the shift controller 38 transmits a shift control signal for switching the state of the power transmission mechanism 14 from the disconnection state to the forward connection state to the ECM 28 (step S27) when the change in the position of the operation lever 33 is a change from the neutral position N to the forward position F. When the change in the position of the operation lever 33 in step S24 is a change from the neutral position N to the forward position F, it is found accordingly that the position of the operation lever 33 is not sequentially changed to the forward position F, the neutral position N, and the reverse position R.

As described above, in the marine vessel propulsion control system 5 according to the example of the present invention, the BCM 35 calculates a simulated ship speed by multiplying an engine rotational speed when the marine vessel 1 travels forward in the propeller co-rotating state and the state of the power transmission mechanism 14 continues the forward connection state by the scale conversion coefficient $S_C$ corresponding to the estimated ship length $L_S$ of the marine vessel 1, and decreases the simulated ship speed based on the gradient data 43 indicating a predetermined decrease gradient together with elapse of time from a time point at which the simulated ship speed is calculated. Further, in a case where the simulated ship speed is not equal to or less than a predetermined simulated ship speed threshold when the position of the operation lever 33 is changed from the forward position F to the neutral position N and is subsequently changed to the reverse position R, the BCM 35 switches the state of the power transmission mechanism 14 from the disconnection state to the reverse connection state after waiting for the simulated ship speed to become equal to or less than the simulated ship speed threshold. Accordingly, in a case where the marine vessel propulsion control system 5 is applied to a plurality of marine vessels having different ship lengths, it is possible to suppress occurrence of deviation of a switching timing of the state of the power transmission mechanism 14 to the reverse connection state when the position of the operation lever 33 is sequentially changed to the forward position F, the neutral position N, and the reverse position R in each of the plurality of marine vessels, such as the state of the power transmission mechanism 14 being switched from the disconnection state to the reverse state before the actual ship speed sufficiently decreases, or the state of the power transmission mechanism 14 being not switched from the disconnection state to the reverse connection state even though the actual ship speed sufficiently decreases. Therefore, the state of the power transmission mechanism 14 is switched from the disconnection state to the reverse connection state and the throttle valve is opened before the actual ship speed sufficiently decreases when the position of the operation lever 33 is sequentially changed to the forward position F, the neutral position N, and the reverse position R in each of the plurality of marine vessels, and therefore, it is possible to prevent a large load from being applied to the power transmission mechanism, the engine, and the like. In addition, the state of the power transmission mechanism 14 is not switched from the disconnection state to the reverse connection state even though the actual ship speed is sufficiently decreased when the position of the operation lever 33 is sequentially changed to the forward position F, the neutral position N, and the reverse position R in each of the plurality of marine vessels having different ship lengths, and therefore, it is possible to suppress the operation of the outboard motor 6 from being unnecessarily dull.

In the marine vessel propulsion control system 5 according to the example of the present invention, the simulated ship speed is calculated by multiplying the engine rotational speed when the marine vessel 1 travels forward in the propeller co-rotating state and the state of the power transmission mechanism 14 continues the forward connection state by the scale conversion coefficient $S_C$ corresponding to the estimated ship length $L_S$ of the marine vessel 1, and therefore, it is possible to suppress occurrence of deviation of a switching timing of the state of the power transmission mechanism 14 to the reverse connection state in a plurality of marine vessels having different ship lengths by reducing the simulated ship speed based on one piece of gradient data 43. That is, in the marine vessel propulsion control system 5 according to the example of the present invention, it is possible to suppress occurrence of deviation of the switching timing of the state of the power transmission mechanism 14 to the reverse connection state in a plurality of marine vessels having different ship lengths without using a plurality of pieces of gradient data respectively corresponding to the plurality of marine vessels having different ship lengths. Therefore, the marine vessel propulsion control system 5 according to the present example has high versatility and can be easily introduced into various marine vessels having different ship lengths. In addition, even when the marine vessel propulsion control system 5 is introduced into a new-type marine vessel, it is not necessary to generate individual gradient data suitable for the new-type marine vessel or store the gradient data in the storage 40 of the BCM 35.

In the marine vessel propulsion control system 5 according to the example of the present invention, the BCM 35 estimates a ship length of the marine vessel 1 based on horsepower of the outboard motor 6 provided in the marine vessel 1 and a sum of the horsepower of the plurality of outboard motors 6 provided in the marine vessel 1. Since the ship length of the marine vessel tends to become longer as the horsepower of the outboard motor that can be mounted becomes larger, the ship length of the marine vessel 1 can be accurately estimated based on the horsepower of the outboard motor 6 provided in the marine vessel 1 or the sum of the horsepower of the plurality of outboard motors 6 provided in the marine vessel 1. In addition, it is possible to facilitate the process of estimating the ship length of the marine vessel 1 by transmitting horsepower information from the outboard motor 6 to the BCM 35.

In the marine vessel propulsion control system 5 according to the example of the present invention, in a case where a plurality of outboard motors are provided in a marine vessel, that is, in a case of multiple outboard motors being installed, the BCM 35 calculates the simulated ship speed by multiplying the engine rotational speed when the marine vessel 1 travels forward in the propeller co-rotating state and the state of the power transmission mechanism 14 continues the forward connection state by the scale conversion coefficient $S_C$ corresponding to the estimated ship length $L_S$ of the marine vessel 1 estimated based on the total horsepower of the plurality of outboard motors 6. Accordingly, even when the marine vessel propulsion control system 5 is applied to a one outboard motor-installed marine vessel or a multiple outboard motors-installed marine vessel, it is possible to suppress occurrence of deviation of the switching timing of the state of the power transmission mechanism 14 to the reverse connection state in each marine vessel.

In the marine vessel propulsion control system 5 according to the example of the present invention, the BCM 35 can easily and accurately recognize that the rotation state of the propeller 13 becomes the propeller co-rotating state based on the engine rotational speed change amount ΔNE.

In the above example, an engine rotational speed at the time point t3 at which a time corresponding to the propeller co-rotation time lag elapses after the throttle valve 12 becomes the fully closed state is acquired and the simulated ship speed is calculated by multiplying the engine rotational speed by the scale conversion coefficient $S_C$, but the timing at which the engine rotational speed is acquired may be between the time point t3 in FIG. 6 and immediately before the time point t5 at which the state of the power transmission mechanism 14 is switched from the forward connection state to the disconnection state. When the time from the time point t3 to the time point t5 is short, the timing at which the state of the power transmission mechanism 14 is switched from the forward connection state to the disconnection state may be delayed, and the time during which the rotation state of the propeller 13 is the propeller co-rotating state and the state of the power transmission mechanism 14 continues the forward connection state may be extended.

In the above example, an example in which the estimated ship length of the marine vessel 1 is determined based on the total horsepower of the outboard motor 6 using the ship length estimation map 41 and the estimated ship length is used to determine the scale conversion coefficient is exemplified. However, the present invention is not limited thereto. The value of the ship length of the marine vessel 1 may be stored in the storage 40 of the BCM 35, for example, and the scale conversion coefficient may be determined using the value of the ship length stored in the storage 40 instead of the estimated ship length. In this case, the value of the ship length is input to the BCM 35 by an operator at the time of attaching the outboard motor 6 to the marine vessel 1, for example. Comparing the value of the ship length input by the operator with the value of the ship length estimated based on the total horsepower of the outboard motors 6, it is determined that the input is erroneous when the input value of the ship length is significantly different from the estimated value of the ship length, and for example, the operator may be requested to input the value of the ship length again. Instead of the ship length of the marine vessel 1, identification information (for example, a ship name, a product name, or a product identification number) of the marine vessel 1 may be stored in the storage 40, the ship length may be determined based on the identification information, and the scale conversion coefficient may be determined using the ship length.

The invention can be appropriately modified without departing from the gist or concept of the invention that can be read from the claims and the entire description, and a marine vessel propulsion control system with such a modification is also included in the technical concept of the present invention.

What is claimed is:

1. A marine vessel propulsion control system, comprising:
an outboard motor provided in a marine vessel;
an operation part configured to operate the outboard motor; and
a control device configured to control the outboard motor based on an operation of the operation part, wherein
the outboard motor includes an engine, a throttle valve configured to adjust an inflow amount of combustion air into the engine, a propeller configured to convert power of the engine into a propulsive force of the marine vessel, a power transmission mechanism configured to transmit the power of the engine to the propeller, and a shift device configured to switch a state of the power transmission mechanism,
the shift device is configured to switch the state of the power transmission mechanism to a disconnection state in which the propulsive force of the marine vessel is not generated, a forward connection state in which a propulsive force for pushing the marine vessel forward is generated, or a reverse connection state in which a propulsive force for pushing the marine vessel rearward is generated,
the control device includes a simulated ship speed calculator and a shift controller,
the simulated ship speed calculator is configured to calculate a simulated ship speed by multiplying an engine rotational speed when the marine vessel travels forward in a propeller co-rotating state due to the throttle valve changing from an open state to a fully closed state and the state of the power transmission mechanism continues the forward connection state by a scale conversion coefficient corresponding to a ship length of the marine vessel, and to decrease the simulated ship speed based on gradient data indicating a predetermined decrease gradient together with elapse of time from a time point at which the simulated ship speed is calculated,
the shift controller is configured to
when the position of the operation part is changed from the forward position to the neutral position, switch the state of the power transmission mechanism from the forward connection state to the disconnection state by controlling the shift device,
in a case where the simulated ship speed is equal to or less than a predetermined simulated ship speed threshold when the position of the operation part is changed from the forward position to the neutral position and is subsequently changed to the reverse position, immediately switch the state of the power transmission mechanism from the disconnection state to the reverse connection state by controlling the shift device, and
in a case where the simulated ship speed is not equal to or less than the predetermined simulated ship speed threshold when the position of the operation part is changed from the forward position to the neutral position and is subsequently changed to the reverse position, switch the state of the power transmission mechanism from the disconnection state to the reverse connection state by controlling the shift device after waiting for the simulated ship speed to become equal to or less than the simulated ship speed threshold.

2. The marine vessel propulsion control system according to claim 1, wherein
the simulated ship speed calculator is configured to estimate a ship length of the marine vessel based on horsepower of the outboard motor.

3. The marine vessel propulsion control system according to claim 2, wherein
when the marine vessel is provided with a plurality of outboard motors, the simulated ship speed calculator is configured to estimate a ship length of the marine vessel based on a sum of horsepower of the plurality of outboard motors.

4. The marine vessel propulsion control system according to claim 1, wherein the scale conversion coefficient is a scale conversion coefficient based on a Froude similarity law, and is calculated by the following formula when a ship length of the marine vessel is defined as $L_S$:

$$\text{scale conversion coefficient}=L_S\hat{}(1/2).$$

5. The marine vessel propulsion control system according to claim 2, wherein the outboard motor is configured to transmit horsepower information indicating horsepower of the outboard motor, and the simulated ship speed calculator is configured to estimate a ship length of the marine vessel based on the horsepower of the outboard motor indicated by the horsepower information, which is transmitted from the outboard motor.

6. The marine vessel propulsion control system according to claim 1, wherein the simulated ship speed calculator is configured to calculate the simulated ship speed by multiplying, by the scale conversion coefficient, an engine rotational speed when a change amount per unit time of the engine rotational speed becomes equal to or less than a predetermined change amount threshold for the first time after the throttle valve is changed from the open state to the fully closed state.

* * * * *